US012785535B2

(12) United States Patent
Kawahara et al.

(10) Patent No.: US 12,785,535 B2

(45) Date of Patent: Nov. 3, 2026

(54) SEMICONDUCTOR DEVICE AND POWER CONVERSION DEVICE WITH TEMPERATURE ESTIMATION AND PULSE CURRENT SUPPLY

(71) Applicant: Mitsubishi Electric Corporation, Tokyo (JP)

(72) Inventors: Chihiro Kawahara, Tokyo (JP); Kenichi Morokuma, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 260 days.

(21) Appl. No.: 18/573,648

(22) PCT Filed: Jun. 29, 2021

(86) PCT No.: PCT/JP2021/024522

§ 371 (c)(1),
(2) Date: Dec. 22, 2023

(87) PCT Pub. No.: WO2023/275981

PCT Pub. Date: Jan. 5, 2023

(65) Prior Publication Data

US 2024/0291402 A1 Aug. 29, 2024

(51) Int. Cl.

*H02M 1/00* (2007.01)
*H02M 1/08* (2006.01)

(Continued)

(52) U.S. Cl.

CPC ........... *H02M 1/0009* (2021.05); *H02M 1/08* (2013.01); *H02M 1/327* (2021.05); *H02M 7/48* (2013.01)

(58) Field of Classification Search

CPC ........ H02M 1/08; H02M 1/083; H02M 1/088; H02M 7/5395; H02M 1/0009; H02M 7/48;

(Continued)

(56) References Cited

U.S. PATENT DOCUMENTS

| | | | | |
|---|---|---|---|---|
| 10,972,088 | B1 * | 4/2021 | Barrenscheen | H02M 1/08 |
| 2012/0113551 | A1 * | 5/2012 | Huang | H02H 5/041 361/18 |

(Continued)

FOREIGN PATENT DOCUMENTS

| | | |
|---|---|---|
| JP | 2002289856 A | 10/2002 |
| JP | 2016-012670 A | 1/2016 |

(Continued)

OTHER PUBLICATIONS

International Search Report and Written Opinion mailed on Sep. 7, 2021, received for PCT Application PCT/JP2021/024522, filed on Jun. 29, 2021, 8 pages including English Translation.

(Continued)

*Primary Examiner* — Jue Zhang
*Assistant Examiner* — Ularislao Cordova
(74) *Attorney, Agent, or Firm* — XSENSUS LLP

(57) ABSTRACT

In a semiconductor device that drives and controls a semiconductor element, a current control unit is provided with a pulse current supply for passing a current between a control terminal and a negative electrode terminal of the semiconductor element. A timing control unit causes the pulse current supply to output a pulsed current during an on-period after the semiconductor element shifts to an on state or during an off-period after the semiconductor element shifts to an off state. A temperature estimation unit estimates the (Continued)

temperature of the semiconductor element on the basis of changes in current and voltage due to current supply from the pulse current supply.

14 Claims, 22 Drawing Sheets

(51) Int. Cl.
*H02M 1/32* (2007.01)
*H02M 7/48* (2007.01)

(58) Field of Classification Search
CPC .... H02M 1/327; H02M 3/3155; H02M 3/325; H02M 3/335; H02M 7/537
See application file for complete search history.

(56) References Cited

U.S. PATENT DOCUMENTS

| | | | | |
|---|---|---|---|---|
| 2013/0320959 | A1* | 12/2013 | Mikata | G01R 31/2603 324/114 |
| 2016/0252402 | A1* | 9/2016 | Singh | G01K 7/42 702/130 |
| 2019/0204889 | A1* | 7/2019 | Kaeriyama | H02M 1/32 |
| 2020/0091907 | A1* | 3/2020 | Kawai | H03K 17/08122 |
| 2020/0236823 | A1 | 7/2020 | Ewanchuk et al. | |
| 2020/0350904 | A1* | 11/2020 | Melkonyan | H03K 17/08122 |
| 2023/0053137 | A1 | 2/2023 | Kawahara et al. | |
| 2023/0059002 | A1* | 2/2023 | Suzuki | H02M 1/08 |
| 2023/0223867 | A1* | 7/2023 | Wada | H02M 1/08 363/97 |

FOREIGN PATENT DOCUMENTS

| | | |
|---|---|---|
| JP | 2020-504297 A | 2/2020 |
| JP | 2020-072569 A | 5/2020 |

OTHER PUBLICATIONS

Brandelero et al., "On-line Virtual Junction Temperature Measurement via DC Gate Current Injection", CIPS 2018—10th International Conference on Integrated Power Electronics Systems, 2018, pp. 423-429.
Office Action mailed May 21, 2026 in corresponding Chinese patent application No. 202180099741.8 (12 pages; with English machine translation).

* cited by examiner

SEMICONDUCTOR DEVICE AND POWER CONVERSION DEVICE WITH TEMPERATURE ESTIMATION AND PULSE CURRENT SUPPLY

CROSS-REFERENCE TO RELATED APPLICATION

This application is a national stage application, filed under 35 U.S.C. § 371, of International Patent Application No. PCT/JP2021/024522, filed Jun. 29, 2021, the entire contents of which are incorporated herein by reference.

TECHNICAL FIELD

The present disclosure relates to a semiconductor device and a power conversion device.

BACKGROUND ART

In a power converter using a power semiconductor element such as an insulated gate bipolar transistor (IGBT) and a metal oxide semiconductor field effect transistor (MOSFET), an increase in density of current flowing through the power semiconductor element has been promoted for miniaturization.

However, increasing the current density increases an energy loss of the power semiconductor element and causes a temperature rise of the power semiconductor element. The power semiconductor element has a maximum allowable operating temperature specified by the properties of semiconductor materials thereof, and the like, and when the temperature is greater than the maximum allowable operating temperature, thermal runaway may occur in the power semiconductor element, which may cause destruction of the power semiconductor device. For this reason, in recent years, temperature management of power semiconductor elements has become more important.

In order to manage the temperature of the power semiconductor element as described above, a method is known, for example, for attaching a temperature sensor such as a thermistor to a fin or the like for cooling the power semiconductor element to indirectly estimate the temperature of the power semiconductor element. However, since the thermal time constant from the power semiconductor element to the fin is generally large, this method may not be able to measure a rapid change in the temperature of the power semiconductor element due to a load variation in a short time.

One of the methods for addressing this problem is disclosed in Japanese Patent Laying-Open No. 2016-12670 (PTL1). With this method, a plurality of gate electrodes is provided on a power semiconductor element to obtain a temperature from a resistance value between the gate electrodes in an energized state.

Still another method is disclosed in Japanese Patent Laying-Open No. 2020-72569 (PTL2). With this method, information indicating a relationship between a temporal change in the gate voltage during a switching operation of the semiconductor device and the temperature of a power semiconductor element is stored in advance, and the temperature of the power semiconductor element is estimated from a time in which the gate voltage rises.

CITATION LIST

Patent Literature

PTL 1: Japanese Patent Laying-Open No. 2016-12670
PTL 2: Japanese Patent Laying-Open No. 2020-72569

SUMMARY OF INVENTION

Technical Problem

However, the method disclosed in PTL1 needs to provide a plurality of gate electrodes in order to read the value of the gate resistance on the power semiconductor element, and this leads to a decrease in the effective area of the power semiconductor element and restricts a reduction in size of a power module including the power semiconductor element. In addition, the method disclosed in PTL2 needs a highly accurate time measurement mechanism and a high-speed processor in order to measure the time in which the gate voltage rises, and providing such a measurement mechanism may restrict a reduction in size of the power module.

The present disclosure has been made in view of the above problems, and an object of the present disclosure is to provide a semiconductor device that drives and controls a power semiconductor element and can be downsized without reducing an effective area of the power semiconductor element while having a temperature measurement function of the power semiconductor element.

Solution to Problem

A semiconductor device according to one aspect that drives and controls a semiconductor element includes a pulse current supply, a drive control unit, a current detection unit, a voltage detection unit, a temperature estimation unit, and a timing control unit. The semiconductor element includes a positive electrode terminal, a negative electrode terminal, and a control terminal for receiving supply of a drive voltage for controlling a current flowing between the positive electrode terminal and the negative electrode terminal. The pulse current supply is provided to pass a pulsed current between the control terminal and the negative electrode terminal. The drive control unit supplies the drive voltage to the control terminal to shift the semiconductor element to an on state and an off state. The current detection unit detects a current being flowed through the semiconductor element by the pulse current supply. The voltage detection unit detects a voltage between the control terminal or the negative electrode terminal and a reference potential. The temperature estimation unit estimates the temperature of the semiconductor element on the basis the detection values of the current detection unit and the voltage detection unit. The timing control unit controls timing to cause the pulse current supply to output a current. The timing control unit causes the pulse current supply to output a current during an on-period after the semiconductor element shifts to the on state or during an off-period after the semiconductor element shifts to the off state.

Advantageous Effects of Invention

The semiconductor device according to the above aspect passes a current between the control terminal and the negative electrode terminal of the semiconductor element by the pulse current supply during the on-period or the off-period of the semiconductor element, and estimates the temperature on the basis of the current and a voltage generated by the current. Therefore, it is possible to provide a semiconductor device that can be reduced in size without reducing the effective area of the semiconductor element and that has a temperature measurement function.

DESCRIPTION OF EMBODIMENTS

Figure 1A:
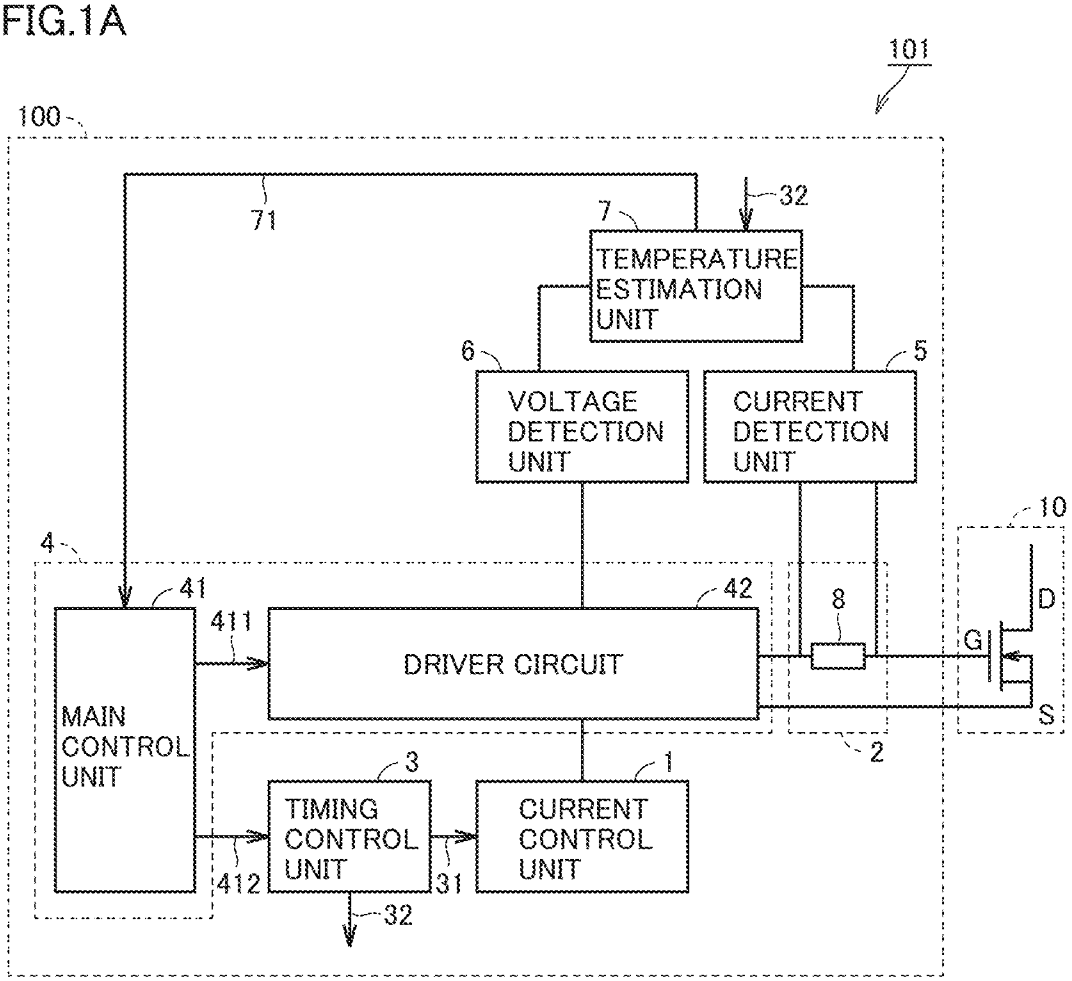
FIG. 1A is a configuration diagram illustrating an example of a power module 101 according to a first embodiment.

Embodiments will be described in detail below with reference to the drawings. The same or corresponding parts in the drawings are denoted by the same reference signs, and the description thereof will not be repeated.

First Embodiment

Figure 1B:
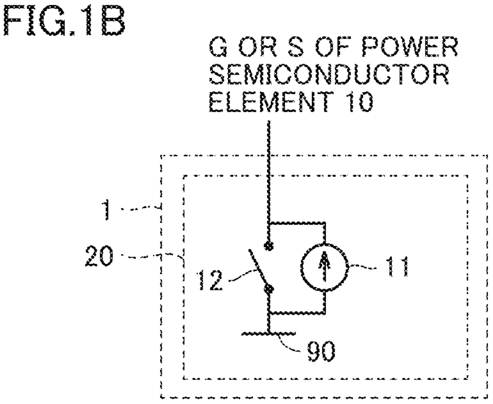
FIG. 1B is a circuit diagram illustrating a configuration example of a current control unit 1 in FIG. 1A.

FIG. 1A is a configuration diagram illustrating an example of power module 101 according to the first embodiment. FIG. 1B is a circuit diagram illustrating a configuration example of current control unit 1 in FIG. 1A. Referring to FIGS. 1A and 1B, the configuration of power module 101 will be described below.

As illustrated in FIG. 1A, power module 101 includes power semiconductor element 10 and semiconductor device 100 that drives and controls power semiconductor element 10. Semiconductor device 100 controls switching of power semiconductor element 10 and measures an element temperature of power semiconductor element 10.

Semiconductor device 100 includes a gate drive unit 4, current control unit 1, a timing control unit 3, a current detection unit 5, voltage detection unit 6, a temperature estimation unit 7, and a resistance element 8 (also referred to as gate resistance). Here, gate drive unit 4 includes driver circuit 42 as a drive control unit that is connected to power semiconductor element 10 and drives power semiconductor element 10, and a main control unit 41 that controls driver circuit 42.

Current control unit 1 is connected to driver circuit 42 and supplies a current between a control terminal G and a negative electrode terminal S of power semiconductor element 10 via driver circuit 42. As illustrated in FIG. 1B, current control unit 1 includes a pulse current supply 20 that can supply a pulsed current. More specifically, pulse current supply 20 includes, for example, a current supply 11 and a current control switch 12 connected in parallel to current supply 11. When current control switch 12 is switched from a closed state to an open state, pulse current supply 20 starts a current output, and when current control switch 12 is switched from the open state to the closed state, pulse current supply 20 ends the current output.

Various types of current supplies that are commonly known can be used as current supply 11. For example, a bipolar transistor, a current mirror, or a current supply provided with a resistor on the output side of a constant voltage source may be used. In addition, current supply 11 may be a current source that outputs a current or may be a current sink that draws a current depending on the circuit configuration. As current control switch 12, a switching element that operates at a relatively high speed such as a MOSFET can be used, for example. When measurement accuracy is required, an ultrafast device such as a GaN high electron mobility transistor (HEMT) may be used as current control switch 12.

As illustrated in FIG. 1B, one end of each of current supply 11 and current control switch 12 is connected to a reference potential node 90 that applies a reference potential. Here, the reference potential is, for example, a control ground of driver circuit 42 or a power supply voltage of driver circuit 42.

The other end of each of current supply 11 and current control switch 12 is directly or indirectly connected to control terminal G or negative electrode terminal S of power semiconductor element 10. When indirectly connected, the other end of each of current supply 11 and current control switch 12 is connected to control terminal G or negative electrode terminal S of power semiconductor element 10 via a semiconductor switching element or a resistor which is another electronic component mounted on driver circuit 42. A case where the other end of each of current supply 11 and current control switch 12 is connected to negative electrode terminal S of power semiconductor element 10 will be described below as an example. In the following description, control terminal G is also referred to as gate G, and negative electrode terminal S is also referred to as source S.

Voltage detection unit 6 is connected to driver circuit 42, and directly or indirectly detects a voltage between control terminal G or negative electrode terminal S and the reference potential via driver circuit 42. When the voltage is indirectly detected, a semiconductor switching element, a resistor, or the like, which is another electronic component mounted on driver circuit 42, is included between the voltage detection unit and the power semiconductor element. The detection value of voltage detection unit 6 includes an influence of a potential effect by the other electronic components.

Timing control unit 3 outputs a switch control signal 31 for controlling current control switch 12 of current control unit 1 on the basis of a command 412 from main control unit 41 of gate drive unit 4. Although timing control unit 3 and gate drive unit 4 are explicitly distinguished from each other in FIG. 1A for the sake of description, timing control unit 3 may be included in main control unit 41. In addition, driver circuit 42 and timing control unit 3 may be mounted on the same substrate, or all of main control unit 41, driver circuit 42, timing control unit 3, and current control unit 1 may be mounted on the same substrate.

As previously described, main control unit 41 controls driver circuit 42 and timing control unit 3. As main control unit 41, a functional device such as a microprocessor, an application specific integrated circuit (ASIC), or a field programmable gate array (FPGA) is used, for example.

Power semiconductor element 10 may be any of a MOSFET, an IGBT, a metal-semiconductor field-effect transistor (MESFET), a bipolar transistor, and the like. A case where power semiconductor element 10 is a MOSFET will be described below as an example. As a material of power semiconductor element 10, SiC, GaN, $Ga_2O_3$, diamond, or the like may be used other than Si. As illustrated in FIG. 1A, power semiconductor element 10 includes a positive electrode terminal D, negative electrode terminal S, and control terminal G. A current flowing between positive electrode terminal D and negative electrode terminal S is controlled by a drive voltage applied to control terminal G.

Control terminal G of power semiconductor element 10 is connected to driver circuit 42 through, for example, resistance element 8 provided in a gate wiring unit 2. Gate wiring unit 2 represents a series of loop wirings connecting control terminal G and negative electrode terminal S of power semiconductor element 10 and driver circuit 42.

Current detection unit 5 detects a current flowing through gate wiring unit 2. Therefore, current detection unit 5 detects the current being flowed through power semiconductor element 10 by current supply 11 when current control switch 12 is opened. In FIG. 1A, current detection unit 5 estimates the current from the voltage across resistance element 8 connected to control terminal G of power semiconductor element 10 as an example. In this case, an instrumentation amplifier, for example, can be used as current detection unit 5. Although FIG. 1A clearly illustrates resistance element 8, a gate resistance may not be provided outside power semiconductor element 10 depending on applications. Examples of other configurations of current detection unit 5 include a current transformer, a Hall element, and a Rogowski coil.

Temperature estimation unit 7 calculates the resistance value of power semiconductor element 10 on the basis of the detection value of voltage detection unit 6, the detection value of current detection unit 5, and control information 32 of timing control unit 3. Temperature estimation unit 7 converts the newly measured resistance value of power semiconductor element 10 into a temperature through comparison with conversion data indicating a relationship between resistance values and element temperatures, measured and recorded in advance. The converted temperature information is fed back to main control unit 41. In a case where the temperature exceeds a predetermined value, main control unit 41 can change a drive pattern so as to reduce the loss of the power semiconductor element, and can further output warning information to a host system. Although main control unit 41 and temperature estimation unit 7 are illustrated as separate components in FIG. 1A for the sake of description, the function of temperature estimation unit 7 may be included in main control unit 41.

Figure 2:
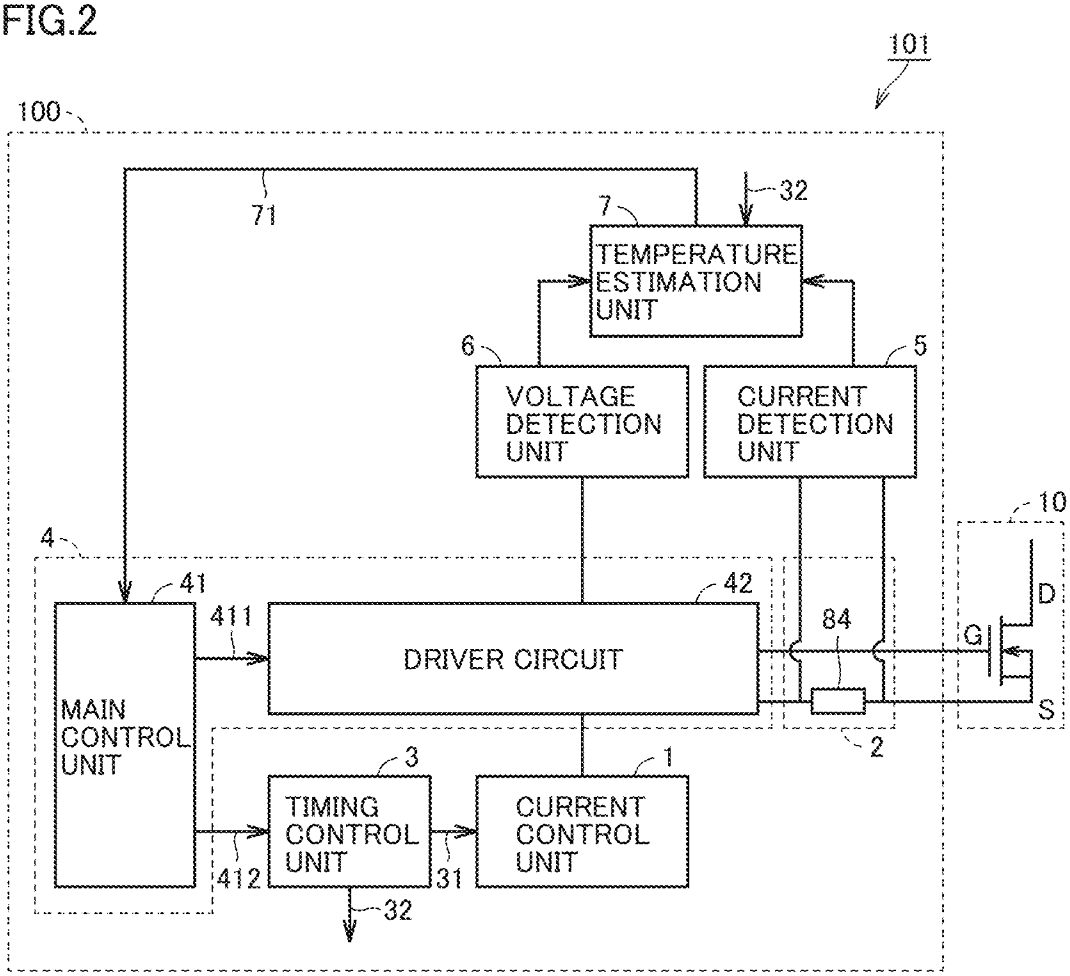
FIG. 2 is a configuration diagram illustrating a modification of power module 101 in FIG. 1A.

FIG. 2 is a configuration diagram illustrating a modification of power module 101 in FIG. 1A. Power module 101 in FIG. 2 is different from power module 101 in FIG. 1A in that resistance element 8 is connected not to the wire (gate wire) connected to control terminal G but to the wire (source wire) connected to negative electrode terminal S. In this case, resistance element 8 is also provided to detect the current flowing through gate wiring unit 2. The other configurations in FIG. 2 are the same as those in FIG. 1A, and thus, the same or corresponding parts in the drawings are denoted by the same reference signs, and the description thereof will not be repeated.

[Method for Estimating Temperature of Power Semiconductor Element]

A method for estimating the temperature of power semiconductor element 10 by semiconductor device 100 in FIG. 1A will be described below more specifically.

Figure 3:
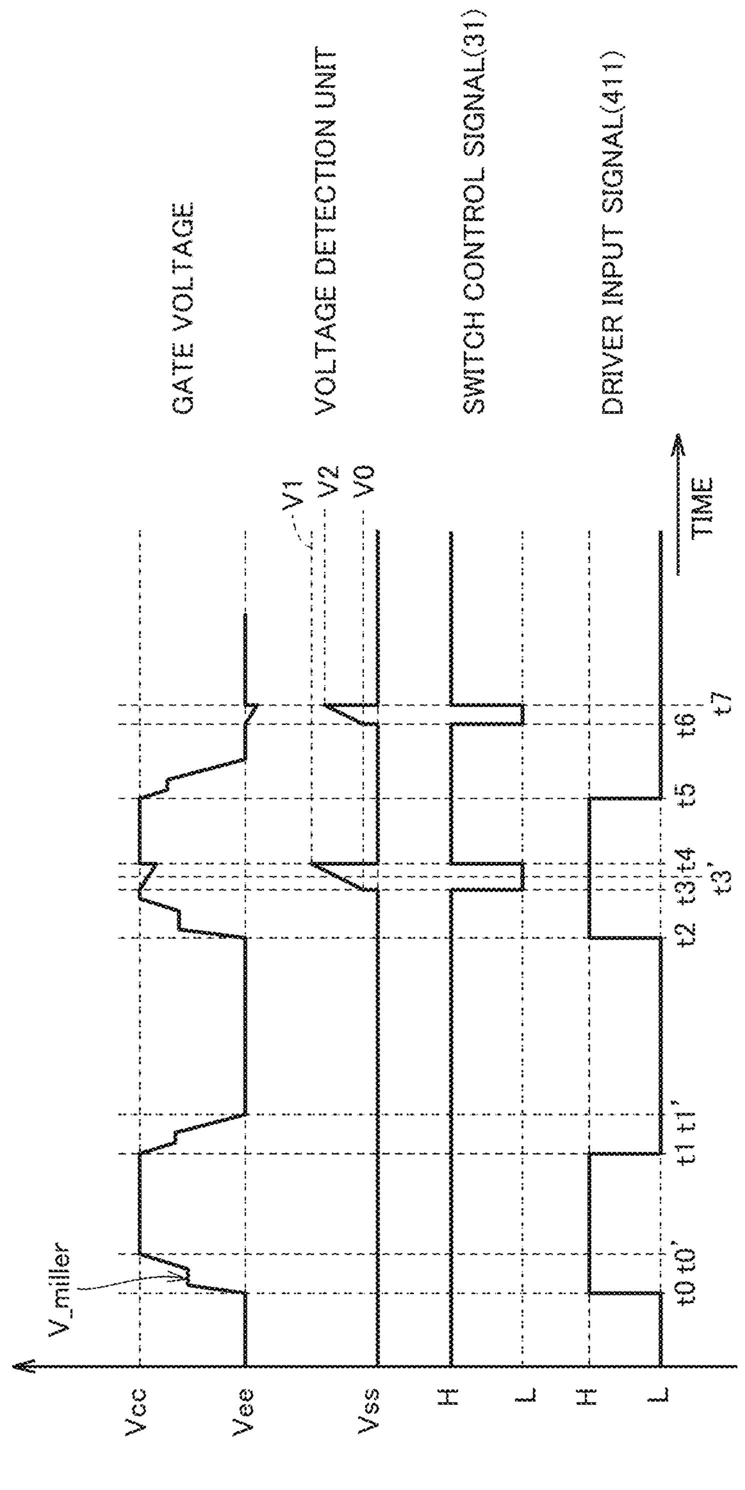
FIG. 3 is a timing chart for describing a temperature estimation method performed by a semiconductor device 100 in FIG. 1A.

FIG. 3 is a timing chart for describing the temperature estimation method performed by semiconductor device 100 in FIG. 1A. In FIG. 3, waveforms up to time t2 indicate voltage waveforms and signal waveforms during a normal switching operation in which temperature measurement is not performed, and waveforms after time t2 indicate voltage waveforms and signal waveforms when temperature measurement is performed together with the switching operation. First, the operation of semiconductor device 100 during a normal switching operation will be described.

(Operation of Semiconductor Device During Normal Operation)

Driver circuit 42 outputs a positive potential Vcc higher than a threshold voltage and a potential Vee (usually, a negative potential or a zero potential) less than or equal to the threshold voltage in order to drive power semiconductor element 10. Specifically, driver circuit 42 applies a positive potential Vcc or a negative or zero potential Vee as a gate voltage to control terminal G of power semiconductor element 10 on the basis of an input signal 411 from main control unit 41.

During the normal operation, timing control unit 3 controls current control switch 12 of current control unit 1 to be always conductive. Therefore, when an enhancement type element such as an n-type MOSFET is used for current control switch 12, a high (H) level signal is constantly input as switch control signal 31 of current control switch 12. When a depression type element such as a p-type MOSFET is used for current control switch 12, a low (L) level signal is constantly input as switch control signal 31.

Specifically, referring to FIG. 3, when input signal 411 to driver circuit 42 turns to an H level at time t0 during a turn-on operation, positive potential Vcc is applied to control terminal G of power semiconductor element 10, so that the gate voltage rises. The gate voltage reaches positive potential Vcc at time t0' after a rise period with a time constant of the resistance value of resistance element 8 and the element capacitance of power semiconductor element 10. At this time, the gate current supplied from driver circuit 42 to power semiconductor element 10 directly flows to reference potential node 90 via current control switch 12. In addition, the current from current supply 11 also flows to reference potential node 90 via current control switch 12 and is not output to driver circuit 42. Note that the Miller voltage V_miller is observed in the rise period between time to and time to'.

In the case of a turn-off operation, input signal 411 of driver circuit 42 changes from H level to L level at time t1. As a result, negative or zero potential Vee is applied to control terminal G of power semiconductor element 10, so that the gate voltage drops. The gate voltage reaches negative or zero potential Vee at time t1' after a fall period as in the turn-on operation. As in the turn-on operation, the gate current flows to reference potential node 90 via current control switch 12. The current from current supply 11 flows to reference potential node 90 via current control switch 12 and is not output to driver circuit 42. Note that the Miller voltage is also observed in the fall period.

(Temperature Measurement During On-Period)

Next, the operation of semiconductor device 100 when temperature measurement is performed will be described. The temperature is measured in a period in which the gate voltage is stable other than the rise period or the fall period of the gate voltage. The period in which the gate voltage is stable includes a period in which the gate voltage is stable at positive potential Vcc (hereinafter referred to as "on-period") and a period in which the gate voltage is stable at negative or zero potential Vee (hereinafter referred to as "off-period").

First, temperature measurement during the on-period will be described. Referring to FIG. 3, switch control signal 31 switches to the L level at time t3 after a lapse of a certain delay period from time t2 at which driver input signal 411 was turned to the H level. This delay time can be simply set as a time constant of the resistance value of resistance element 8 and the element capacitance of power semiconductor element 10 or longer. When the delay time is short, a gate drive current from driver circuit 42 is also detected by current detection unit 5, which affects the accuracy of temperature measurement. On the other hand, when the delay time is long, time t4 at which switch control signal 31 is returned to the H level is close to time t5 at which the turn-off is started. As a result, the gate drive current from driver circuit 42 is also detected by current detection unit 5, which affects the accuracy of temperature measurement.

When switch control signal 31 is turned to the L level (time t3), current control switch 12 in FIG. 1B is turned off. As a result, the current from current supply 11 flows not to reference potential node 90 but to power semiconductor element 10. At this time, the voltage detected by voltage detection unit 6 is expressed by following Expression (1).

[Expression 1]

$$V_{Ig}(t-t3) = (R_g + R_{gint}) \cdot I_g + \frac{t-t3}{C_{die}} \cdot I_g \big|_{t \geq t3} \quad (1)$$

In Expression (1), $V_{Ig}$(t−t3) represents a voltage detected by voltage detection unit 6 at time t. $R_{gint}$ is a value of a gate resistance (internal gate resistance) in power semiconductor element 10. The internal gate resistance is created by a material such as polysilicon on power semiconductor element 10, for example. Alternatively, the internal gate resistance includes a parasitic resistance due to a gate wiring pattern on power semiconductor element 10. $R_g$ represents the resistance on driver circuit 42 and the value of resistance element 8, and represents a resistance component other than the resistance caused by power semiconductor element 10 itself. $C_{die}$ represents a capacitance value seen from the gate side of power semiconductor element 10. Ig represents a supply current from current supply 11.

When current control switch 12 is turned off and current injection from current supply 11 to power semiconductor element 10 is started in current control unit 1 illustrated in FIG. 1B, voltage $V_{Ig}$ is generated according to Expression (1). Specifically, first, voltage V0=($R_g$+$R_{gint}$)·Ig obtained by multiplying the total value of the internal gate resistance of power semiconductor element 10, the value of resistance element 8, and the resistance on driver circuit 42 by the value of current supplied from current supply 11 as represented by the first term on the right side of Expression (1) is constantly generated.

Furthermore, after time t3 at which current control switch 12 is turned off, a charge voltage rises according to (t−t3) ·Ig/$C_{die}$ due to charging of the parasitic capacitance of power semiconductor element 10 as represented by the second term on the right side of Expression (1). In a case where parasitic capacitance $C_{die}$ is constant and current Ig of current supply 11 has a constant value, the voltage detected by voltage detection unit 6 linearly increases. Therefore, resistance value $R_g$+$R_{gint}$ can be calculated using the voltage detection value at optional time point t3', the elapsed time (t3'−t3) from time t3 at which current control switch 12 is turned off, and gate current value Ig detected by current detection unit 5.

Actually, each of resistance values $R_g$ and $R_{gint}$ has temperature dependency. When having linear temperature dependency, resistance values $R_g$ and $R_{gint}$ are represented as $R_g(T) \approx R_{g0}(1+K_1 \cdot T)$ and $R_{gint}(T) \approx R_{gint0}(1+K_2 \cdot T)$. If the temperature dependency of resistance $R_g$ other than the internal gate resistance of power semiconductor element 10 is sufficiently smaller than the temperature dependency of internal gate resistance $R_{gint}$ of power semiconductor element 10, that is, if $\Delta R_g < \Delta R_{gint}$, the temperature dependency of resistance value $R_g$+$R_{gint}$ represents the temperature dependency of the internal gate resistance of power semiconductor element 10. Therefore, the temperature of power semiconductor element 10 can be calculated by comparing resistance value $R_g+R_{gint}$ obtained by the above-described calculation with calibration data representing the relationship between resistance values and temperatures recorded in advance. The calibration data described above can be acquired by, for example, obtaining resistance value $R_g+R_{gint}$ in a manner similar to the manner described above when power module 101 is installed in a thermostatic bath and the element temperature of power semiconductor element 10 is changed from the outside. When it is difficult to acquire calibration data, a rate of change (temperature coefficient) of internal gate resistance $R_{gint}$ due to temperature is acquired in advance, and the calculation using the acquired temperature coefficient can be applied instead.

(Temperature Measurement During Off-Period)

Next, temperature measurement during the off-period will be described. Switch control signal 31 switches to the L level at time t6 after a lapse of a certain delay period from time t5 at which driver input signal 411 has been turned to the L level in FIG. 3. As described above, this delay time can be simply set as a time constant of the resistance value of resistance element 8 and the element capacitance of power semiconductor element 10 or longer. When the delay time is short, the gate drive current from driver circuit 42 is also detected by current detection unit 5, which affects the accuracy of temperature measurement.

When switch control signal 31 is turned to the L level (time t6), current control switch 12 in FIG. 1B is turned off. As a result, the current from current supply 11 flows not to reference potential node 90 but to power semiconductor element 10.

When current control switch 12 is turned off and current injection from current supply 11 to power semiconductor element 10 is started, voltage $V_{Ig}$ is generated according to Expression (1) (note that time t3 is replaced with time t6). Specifically, voltage $V0=(R_g+R_{gint})\cdot Ig$ is generated by multiplying the total value of the internal gate resistance of power semiconductor element 10 and the value of resistance element 8 by current Ig supplied from the current supply. Furthermore, $(t-t6)\cdot I_g/C_{die}$, which is the charge voltage of the parasitic capacitance of power semiconductor element 10, increases with time. Similar to the measurement during the on-period, when parasitic capacitance $C_{die}$ has a constant value and gate current $I_g$ has a constant value, the detection voltage of voltage detection unit 6 linearly increases. Therefore, resistance value $R_g+R_{gint}$ can be calculated using the voltage detection value at optional time point t6' between time t6 and time t7, the elapsed time (t6'−t6) from time t6 at which current control switch 12 is turned off, and gate current value $I_g$ detected by current detection unit 5. If the temperature dependency of the gate resistance other than the internal gate resistance of power semiconductor element 10 is sufficiently smaller than the temperature dependency of the internal gate resistance, the temperature dependency of resistance value $R_g+R_{gint}$ represents the temperature dependency of the internal gate resistance of power semiconductor element 10. Therefore, the temperature of power semiconductor element 10 can be calculated by comparing resistance value $R_g+R_{gint}$ obtained by the above-described calculation with calibration data representing the relationship between the resistance values and the temperatures recorded in advance.

Effect of First Embodiment

As described above, power module 101 according to the present embodiment measures a voltage change when gate current $I_g$ is injected from current supply 11 during the on-period or the off-period of power semiconductor element 10, thereby being capable of stably obtaining the temperature of power semiconductor element 10. The timing of starting the injection of the gate current can be determined as a time point after the lapse of a delay time simply set as a time constant of the gate resistance and the element capacitance or a time longer than or equal to the time constant from the rise timing or fall timing of the driver voltage.

Second Embodiment

In practice, gate capacitance $C_{die}$ of power semiconductor element 10 changes depending on a terminal voltage of power semiconductor element 10. In view of this, the second embodiment will describe a method for suppressing the influence of a change in gate capacitance $C_{die}$.

Figure 4:
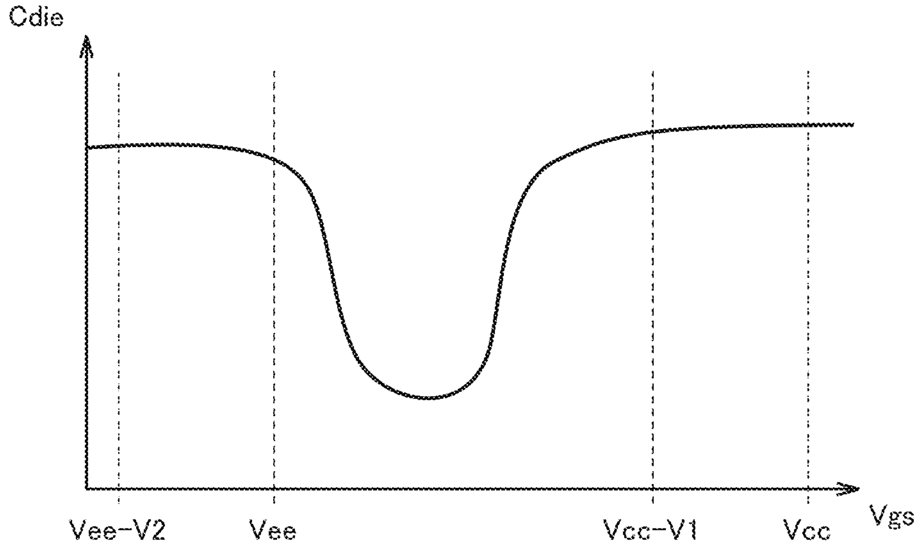
FIG. 4 is a diagram illustrating a change in gate capacitance of a typical MOSFET.

FIG. 4 is a diagram illustrating a change in gate capacitance of a typical MOSFET. As illustrated in FIG. 4, gate capacitance $C_{die}$ has a substantially constant value in a region (storage region) where a gate-source voltage Vgs is sufficiently low and a region (inversion region) where gate-source voltage Vgs is sufficiently high. On the other hand, gate capacitance $C_{die}$ greatly varies in a transition region where gate-source voltage Vgs is in an intermediate region (depletion region). Depending on power semiconductor element 10, a variation amount of gate capacitance $C_{die}$ in the intermediate region is about 30% of gate capacitance $C_{die}$ in the storage region. Such characteristics can be confirmed in advance, for example, by measuring the dependency of gate capacitance $C_{die}$ on gate-source voltage Vgs with respect to the MOSFET before shipment.

Therefore, in the intermediate region where the capacitance greatly varies, the voltage of voltage detection unit 6 does not linearly rise as represented by Expression (1), which affects the estimation accuracy of the temperature. For example, according to the timing chart illustrated in FIG. 3, the voltage detected by voltage detection unit 6 increases due to supply of a current from current supply 11 to power semiconductor element 10, and gate-source voltage Vgs applied to power semiconductor element 10 changes.

In consideration of the above point, according to one aspect of power module 101 of the second embodiment, timing control unit 3 holds switch control signal 31 at the L level only for a certain period from t4 to t3 in which an amount of change in the voltage value detected by voltage detection unit 6 is less than or equal to a certain voltage V1, and sets switch control signal 31 at the H level when an amount of change in the detection voltage exceeds voltage V1. Switch control signal 31 is returned to the H level at time t4, whereby current control switch 12 is conducted, and voltage Vgs applied between the gate and the source of power semiconductor element 10 becomes equal to the voltage supplied from driver circuit 42. As described above, the timing control is performed such that an amount of change in the voltage detected by voltage detection unit 6 is less than or equal to the threshold determined according to the capacitance characteristics of power semiconductor element 10, whereby the variation of element capacitance $C_{die}$ can be prevented and the degradation of the temperature estimation accuracy can be prevented.

Further, element capacitance $C_{die}$ also changes depending on the drain-source voltage of power semiconductor element 10. Therefore, a degree of change in element capacitance $C_{die}$ is different between the on-period and the off-period. Accordingly, in the measurement during the off-period, timing control unit 3 holds switch control signal 31 at the L level only during a certain period from t5 to t6 in which an amount of change of the detection voltage of the voltage detection unit is less than or equal to a certain voltage V2 different from voltage V1, and turns off current control switch 12. Switch control signal 31 is returned to the H level at time t6, whereby current control switch 12 is conducted, and gate-source voltage Vgs of power semiconductor element 10 becomes equal to the voltage supplied from driver circuit 42.

Power module 101 according to the second embodiment can prevent a decrease in temperature estimation accuracy by performing, by main control unit 41, a timing control so that an amount of change of the voltage detected by voltage detection unit 6 is less than or equal to the threshold.

Third Embodiment

Referring to FIGS. 5 to 11B, the configuration of semiconductor device 100 of power module 101 according to the third embodiment will be described below. Unlike FIGS. 1A and 1B, the configuration of current control unit 1 in power module 101 according to the third embodiment is illustrated more specifically. The configuration of power module 101 according to the third embodiment for the components except for current control unit 1 is similar to those in the first and second embodiments, and thus, the same or corresponding portions are denoted by the same reference numerals, and the description thereof will not be repeated. Note that, as current supply 11 constituting current control unit 1, a current source that supplies a current to a load can be used, or a current sink that absorbs a current from a load can be used.

[First Mode]

Figure 5:
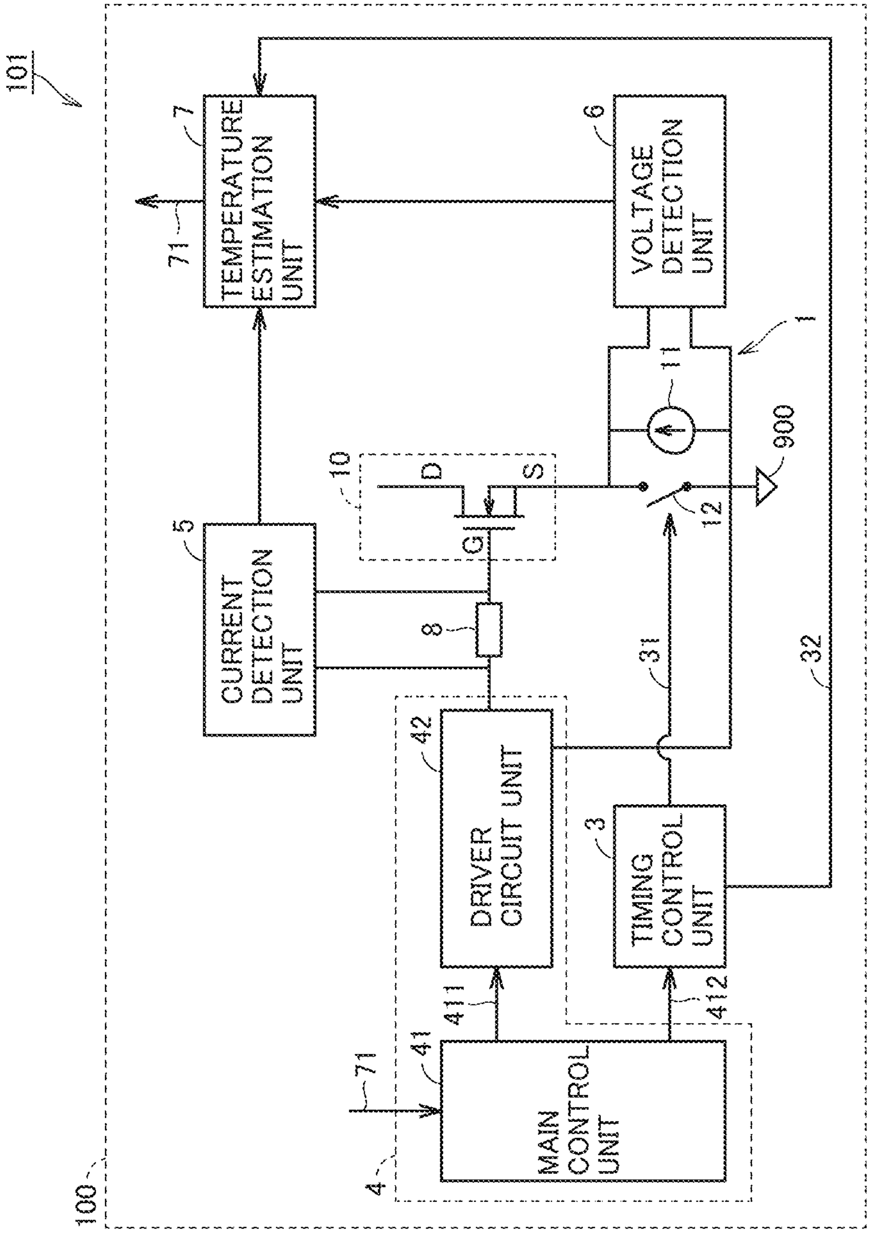
FIG. 5 is a configuration diagram illustrating a first mode of a power module according to a third embodiment.

FIG. 5 is a configuration diagram illustrating a first mode of the power module according to the third embodiment. FIG. 5 illustrates an example in which current control unit 1 is disposed on the source S side of power semiconductor element 10. In this case, the reference potential of current control unit 1 is a control ground 900 of driver circuit 42. Therefore, current supply 11 and current control switch 12 are connected between negative electrode terminal S of power semiconductor element 10 and control ground 900.

The current from current supply 11 all flows to reference potential 900 when switch control signal 31 is at the H level, that is, when current control switch 12 is conductive. When switch control signal 31 is at the L level, the current from current supply 11 flows toward power semiconductor element 10, and flows into power semiconductor element 10 from source S. Therefore, gate-source voltage Vgs of power semiconductor element 10 changes as indicated during the period from time t3 to time t4 in FIG. 3 in the on-period, and changes as indicated during the period from time t6 to time t7 in FIG. 3 in the off-period.

Here, the gate-source voltage and the drain-source voltage applied to power semiconductor element 10 are different between during the on-period and during the off-period, and as a result, capacitance $C_{die}$ of power semiconductor element 10 is also different. For this reason, the voltage waveform of the gate voltage is not the same between the on-period and the off-period, and thus the voltage detected by voltage detection unit 6 takes different values such as V1 during the on-period and V2 during the off-period as illustrated in FIG. 3, for example.

[Second Mode]

Figure 6:
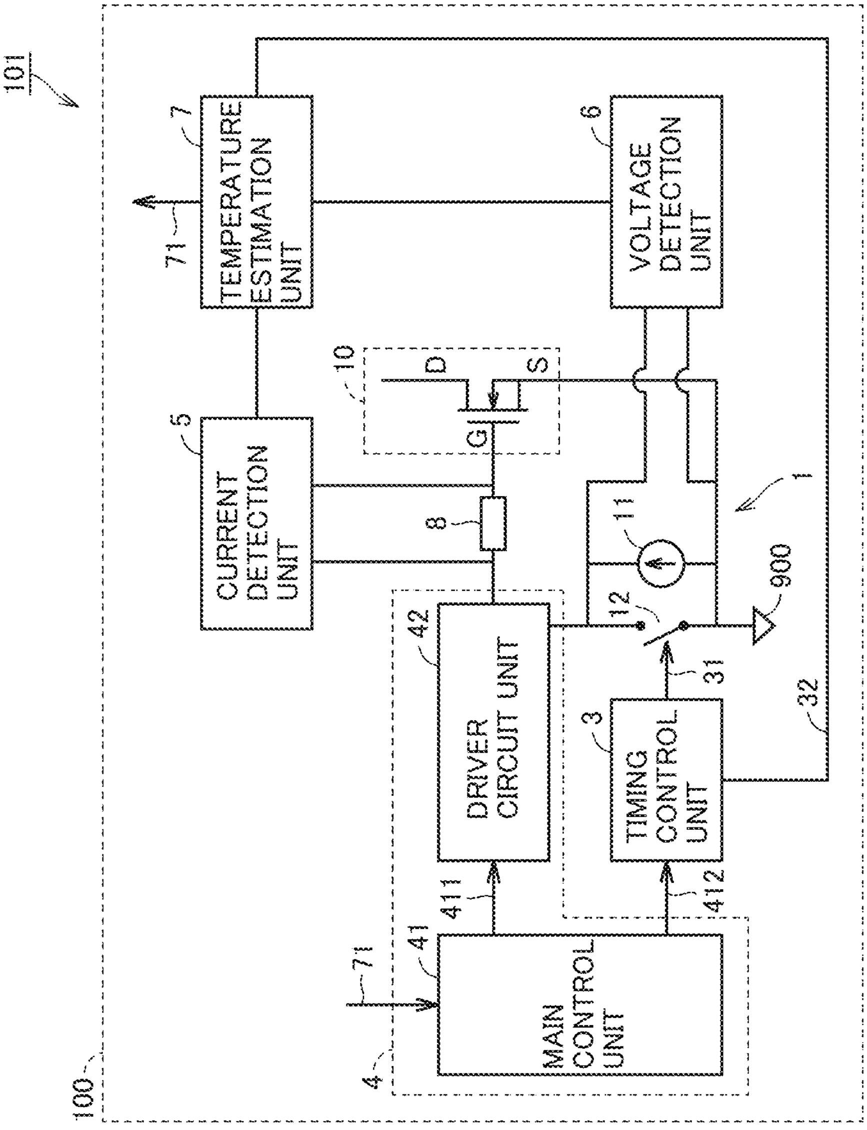
FIG. 6 is a configuration diagram illustrating a second mode of the power module according to the third embodiment.

FIG. 6 is a configuration diagram illustrating a second mode of the power module according to the third embodiment. FIG. 6 illustrates an example in which current control unit 1 is disposed on the gate side of power semiconductor element 10. In FIG. 6, a current source is used as current supply 11. The reference potential of current control unit 1 is control ground 900 of driver circuit 42.

Figure 7:
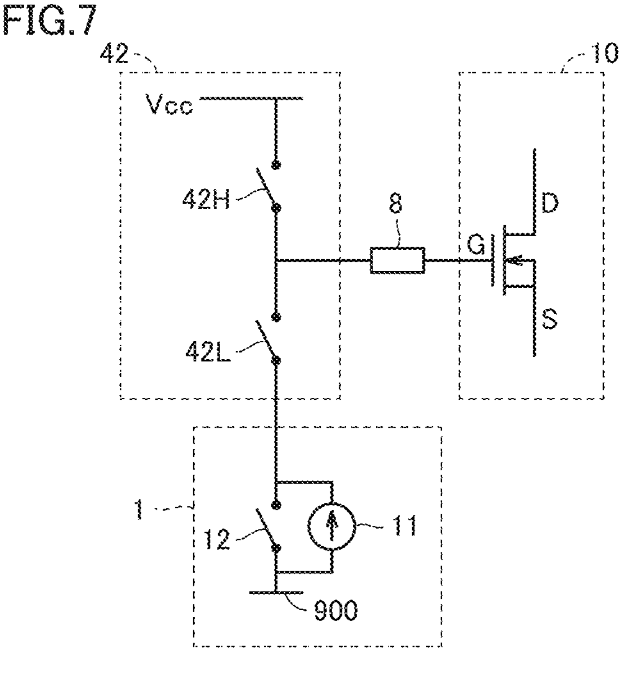
FIG. 7 is a configuration diagram of a portion including current control unit 1, an output stage of a driver circuit 42, a resistance element 8, and a power semiconductor element 10 in the circuit configuration of FIG. 6.

FIG. 7 is a configuration diagram of a portion including current control unit 1, an output stage of driver circuit 42, resistance element 8, and power semiconductor element 10 in the circuit configuration of FIG. 6.

Referring to FIG. 7, the output stage of driver circuit 42 includes a high potential side switch 42H and a low potential side switch 42L connected in series with each other. One end of high potential side switch 42H is connected to positive potential Vcc. One end of low potential side switch 42L is connected to reference potential 900 via current supply 11 and current control switch 12 of current control unit 1. The other ends (that is, a connection point of switches 42H and 42L) of high potential side switch 42H and low potential side switch 42L are connected to control terminal G of power semiconductor element 10 via resistance element 8. Therefore, current supply 11 and current control switch 12 are connected between control terminal G of power semiconductor element 10 and control ground 900 that applies a reference potential.

According to the above configuration, the current from current supply 11 of current control unit 1 can be supplied to control terminal G of power semiconductor element 10 only when the output of driver circuit 42 is at the L level (that is, only when low potential side switch 42L is in an on state).

Figure 8:
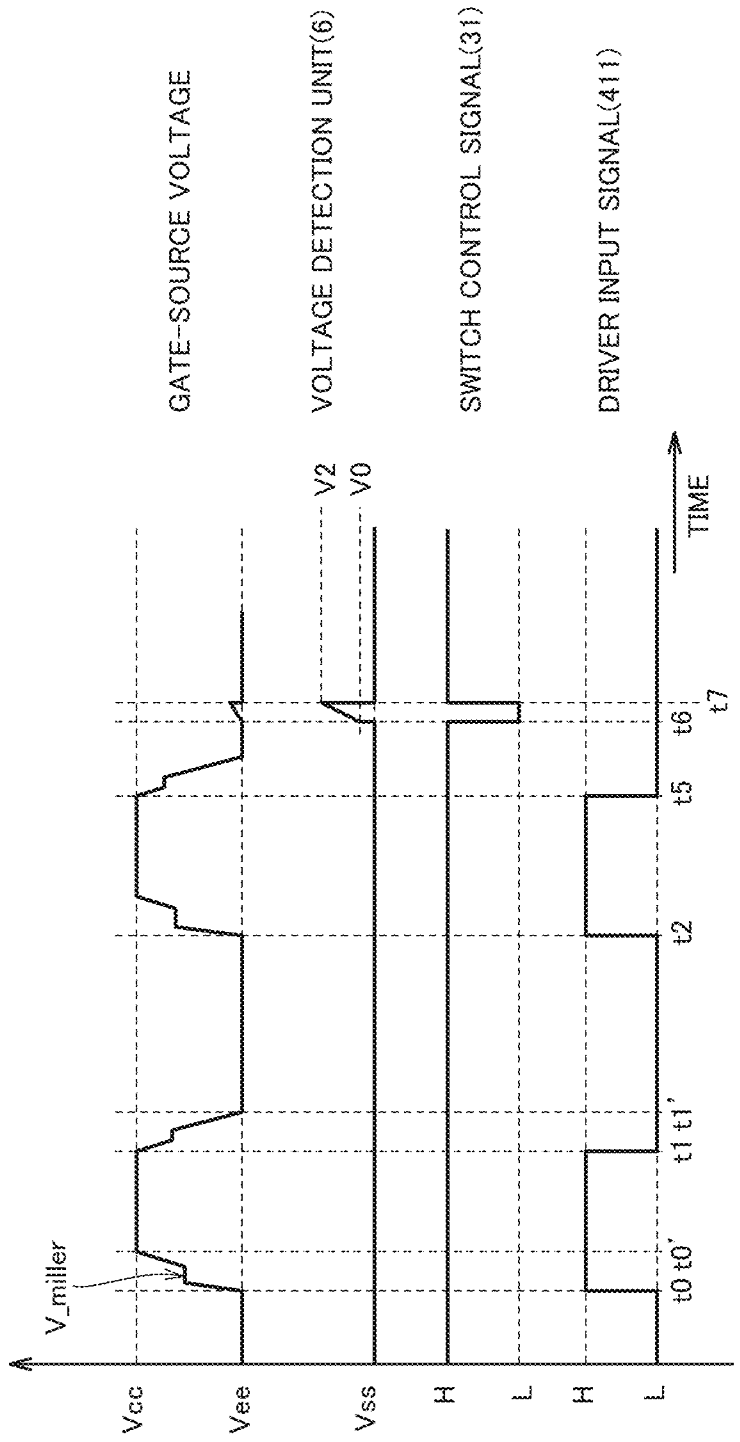
FIG. 8 is a timing chart for describing a method for measuring the temperature of power semiconductor element 10 by semiconductor device 100 illustrated in FIGS. 6 and 7.

FIG. 8 is a timing chart for describing a method for measuring the temperature of power semiconductor element 10 by semiconductor device 100 illustrated in FIGS. 6 and 7. As illustrated in FIG. 8, main control unit 41 sets switch control signal 31 to the L level during a period from time t6 to time t7 after time t5 at which driver input signal 411 is at the L level, thereby inputting a current from current supply 11 to control terminal G of power semiconductor element 10.

[Third Mode]

Figure 9:
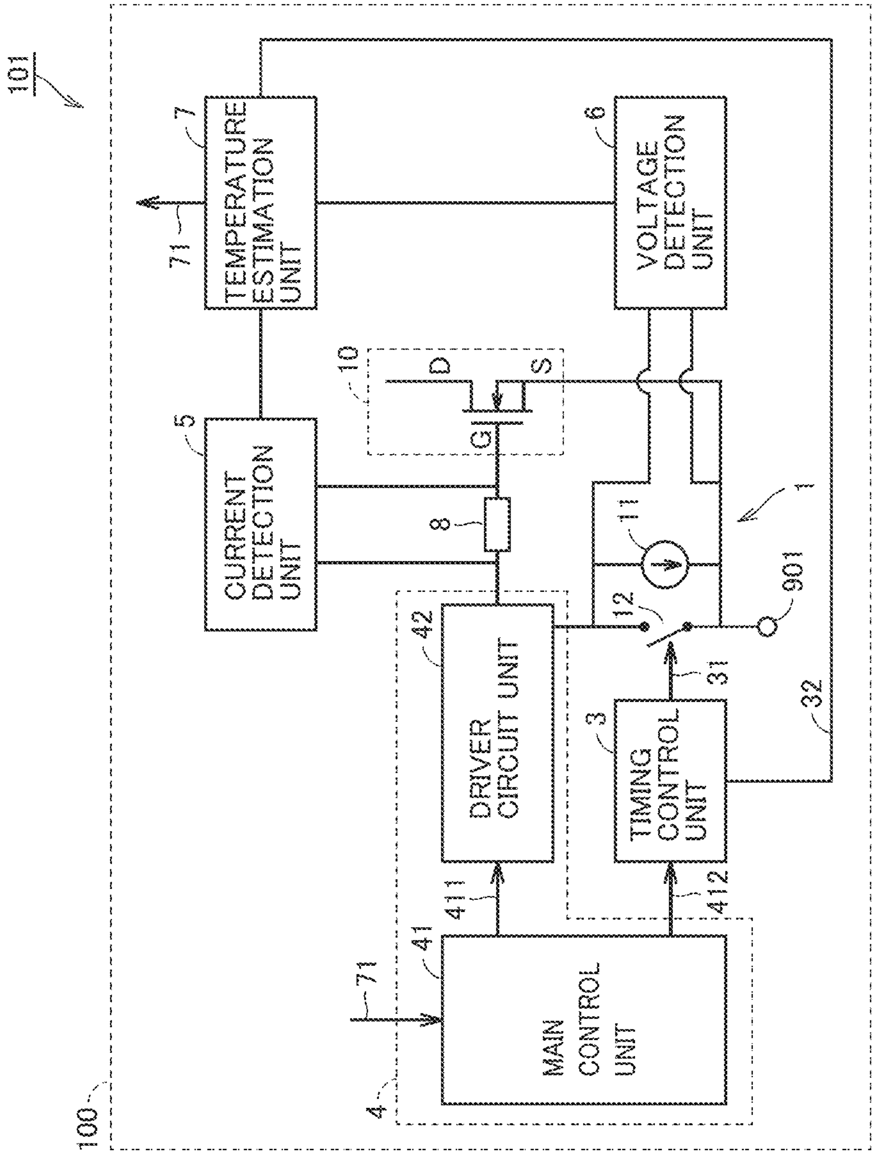
FIG. 9 is a configuration diagram illustrating a third mode of the power module according to the third embodiment.

FIG. 9 is a configuration diagram illustrating a third mode of the power module according to the third embodiment. FIG. 9 illustrates an example in which current control unit 1 is disposed on the gate side of power semiconductor element 10. In FIG. 9, a current source or a current sink can be used as current supply 11. Reference potential 901 of driver circuit 42 will be described later with reference to FIGS. 10A and 10B.

Figure 10A:
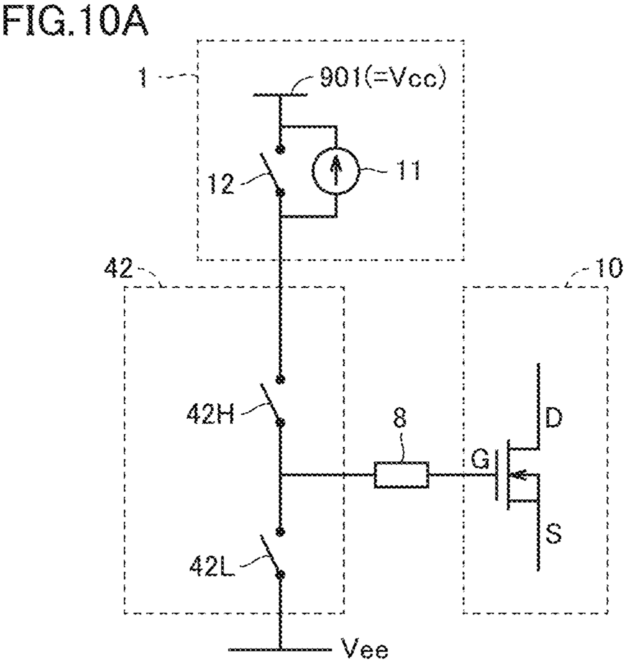
FIG. 10A is a configuration diagram of a portion including current control unit 1, an output stage of driver circuit 42, resistance element 8, and power semiconductor element 10 in the circuit configuration of FIG. 9 (in a case where a current supply is a current sink).
Figure 10B:
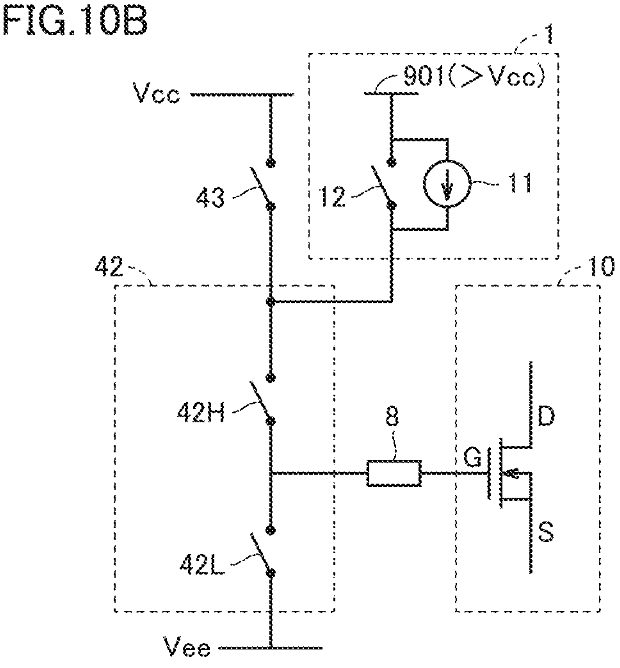
FIG. 10B is a configuration diagram of a portion including current control unit 1, the output stage of driver circuit 42, resistance element 8, and power semiconductor element 10 in the circuit configuration of FIG. 9 (in a case where the current supply is a current source).

FIGS. 10A and 10B are configuration diagrams of a portion including current control unit 1, an output stage of driver circuit 42, resistance element 8, and power semiconductor element 10 in the circuit configuration of FIG. 9. The circuit diagram of FIG. 10A illustrates a case where a current sink is used as current supply 11, and the circuit diagram of FIG. 10B illustrates a case where a current source is used as current supply 11.

Referring to FIG. 10A, the output stage of driver circuit 42 includes high potential side switch 42H and low potential side switch 42L connected in series with each other. One end of high potential side switch 42H is connected to reference potential 901 via current supply 11 and current control switch 12 of current control unit 1. Reference potential 901 in this case is equal to power supply voltage Vcc of driver circuit 42. One end of low potential side switch 42L is connected to ground potential Vee of driver circuit 42. The other ends (that is, a connection point of switches 42H and 42L) of high potential side switch 42H and low potential side switch 42L are connected to control terminal G of power semiconductor element 10 via resistance element 8. Therefore, current supply 11 and current control switch 12 are connected between control terminal G of power semiconductor element 10 and reference potential 901 equal to power supply voltage Vcc of driver circuit 42.

Referring to FIG. 10B, the output stage of driver circuit 42 includes high potential side switch 42H and low potential side switch 42L connected in series with each other. One end of high potential side switch 42H is connected to power supply voltage Vcc of driver circuit 42 via a disconnection switch 43, and is connected to reference potential 901 via current supply 11 and current control switch 12 of current control unit 1. Reference potential 901 in this case is higher than power supply voltage Vcc of driver circuit 42. The other ends (that is, a connection point of switches 42H and 42L) of high potential side switch 42H and low potential side switch 42L are connected to control terminal G of power semiconductor element 10 via resistance element 8. Therefore, current supply 11 and current control switch 12 are connected between control terminal G of power semiconductor element 10 and reference potential 901 higher than power supply voltage Vcc of driver circuit 42.

Disconnection switch 43 is provided to disconnect driver circuit 42 from power supply voltage Vcc of driver circuit 42 during supply of current from current supply 11 of current control unit 1. Thus, the current output from current supply 11 of current control unit 1 can be supplied to power semiconductor element 10. Disconnection switch 43 is controlled at the same timing as switch control signal 31. When an n-type MOSFET is used as disconnection switch 43, a signal obtained by shifting the reference potential of switch control signal 31 with a level shifter or the like can be used as the control signal of disconnection switch 43.

Figure 11A:
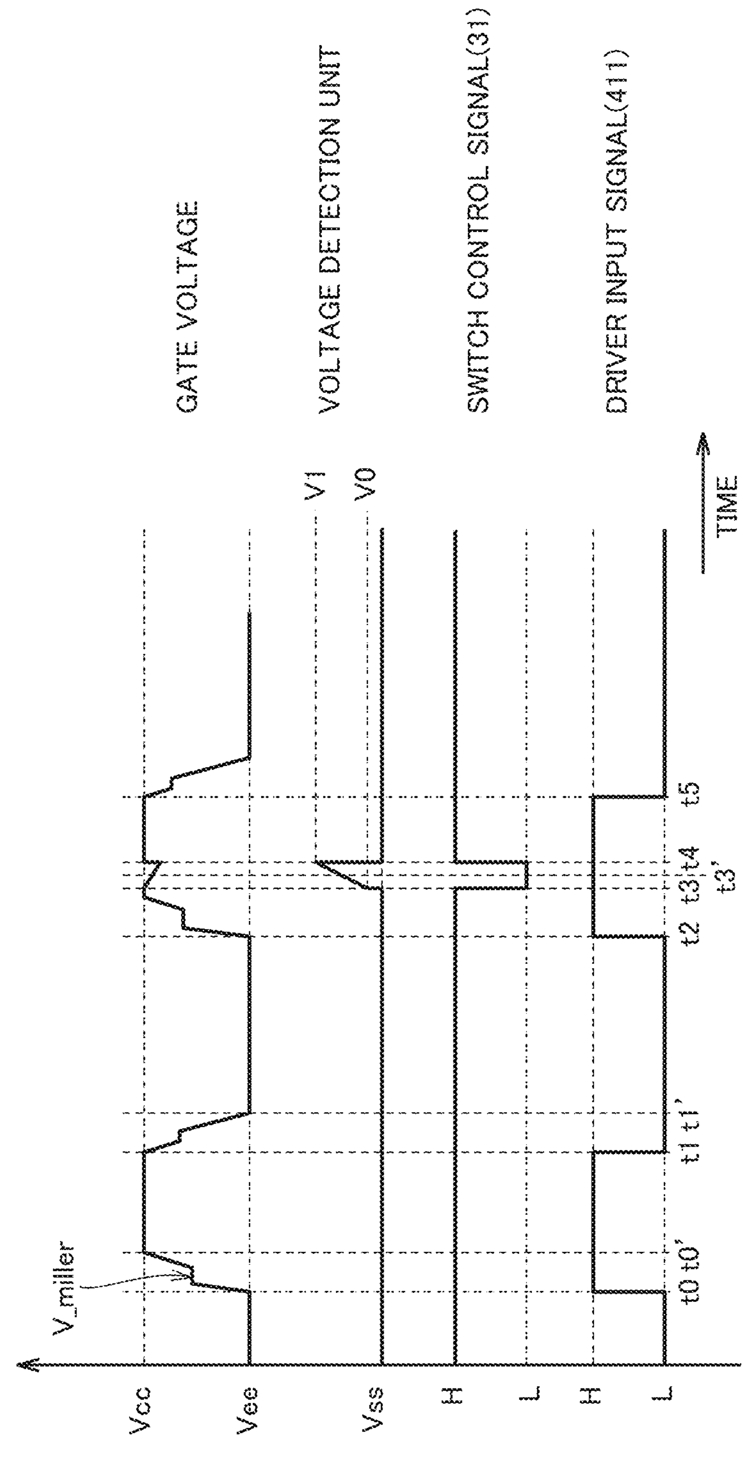
FIG. 11A is a timing chart for describing a method for measuring the temperature of power semiconductor element 10 in the circuit configuration of the current control unit in FIG. 10A.

FIG. 11A is a timing chart for describing a method for measuring the temperature of power semiconductor element 10 in the circuit configuration of the current control unit in FIG. 10A.

As illustrated in FIG. 10A, current supply 11 of current control unit 1 is connected as a current sink to the high potential side of the output stage of driver circuit 42. In this case, main control unit 41 can draw the current from control terminal G of power semiconductor element 10 to current supply 11 by setting switch control signal 31 to the L level only from time t3 to time t4 during the on-period in FIG. 11A. During the period from time t3 to time t4, the gate voltage decreases, and the detection voltage of voltage detection unit 6 increases as illustrated in FIG. 11A.

Figure 11B:
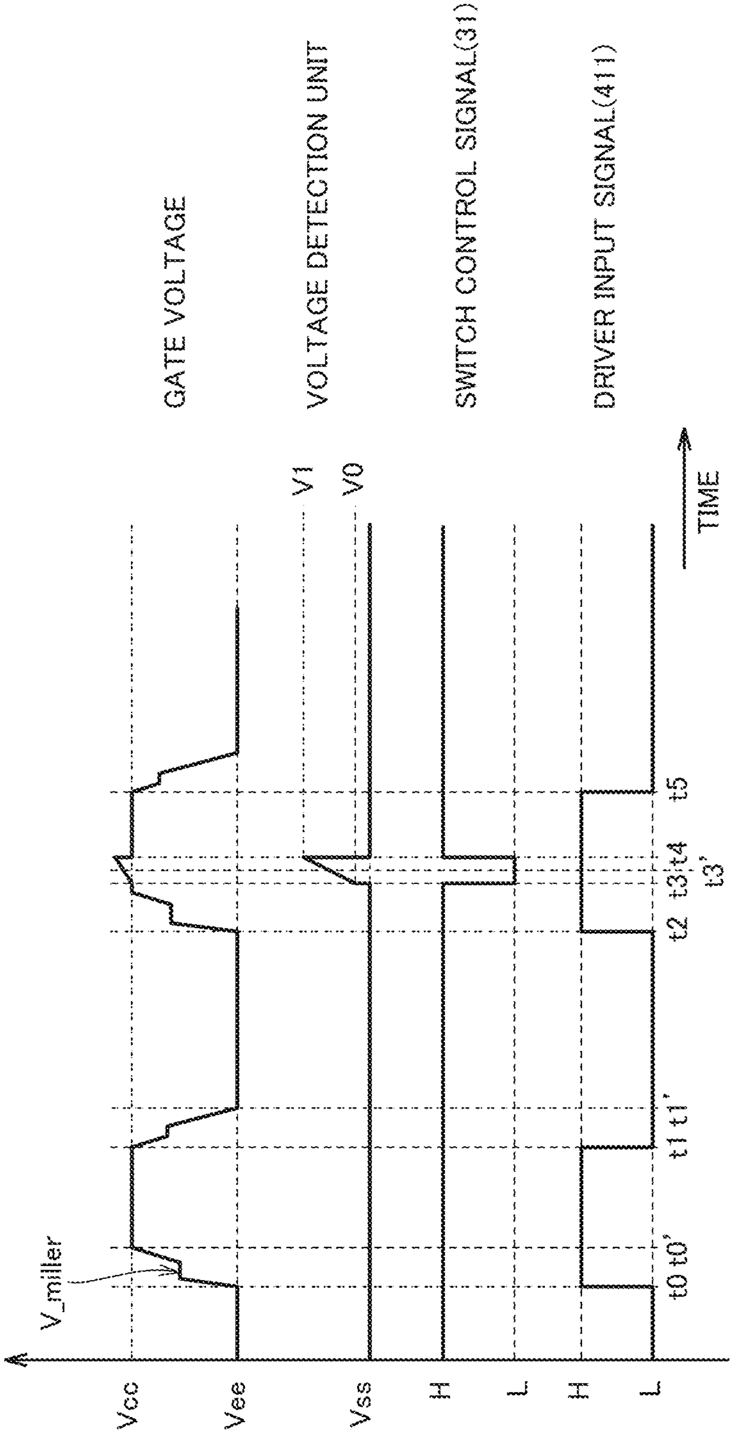
FIG. 11B is a timing chart for describing a method for measuring the temperature of power semiconductor element 10 in the circuit configuration of the current control unit in FIG. 10B.

FIG. 11B is a timing chart for describing a method for measuring the temperature of power semiconductor element 10 in the circuit configuration of the current control unit in FIG. 10B.

As illustrated in FIG. 10B, current supply 11 of current control unit 1 is connected as a current source to the high potential side of the output stage of driver circuit 42. In this case, main control unit 41 can supply the current from current supply 11 to control terminal G of power semiconductor element 10 by setting switch control signal 31 to the L level only from time t3 to time t4 during the on-period in FIG. 11B. During the period from time t3 to time t4, the gate voltage increases, and the detection voltage of voltage detection unit 6 increases as illustrated in FIG. 11B.

As described above, when current control unit 1 having the circuit configuration illustrated in FIG. 9 is used, driver circuit 42 can supply the current to control terminal G of power semiconductor element 10 only during the on-period of power semiconductor element 10. In addition, by using the circuit configuration of FIGS. 5, 6, and 9 of the third embodiment, the temperature of power semiconductor element 10 can be estimated even when the current output from current control unit 1 is supplied to control terminal G or negative electrode terminal S of power semiconductor element 10.

Fourth Embodiment

The fourth embodiment will describe an example in which a plurality of power semiconductor elements 10 is connected in parallel. A case where three power semiconductor elements 10A, 10B, and 10C are connected in parallel will be described below, but the number of the plurality of power semiconductor elements 10 connected in parallel is not limited to three. Note that, in a case where the plurality of power semiconductor elements 10A, 10B, and 10C is collectively referred to, or in a case where any one of the power semiconductor elements is referred to, it is referred to as power semiconductor element 10.

Figure 12:
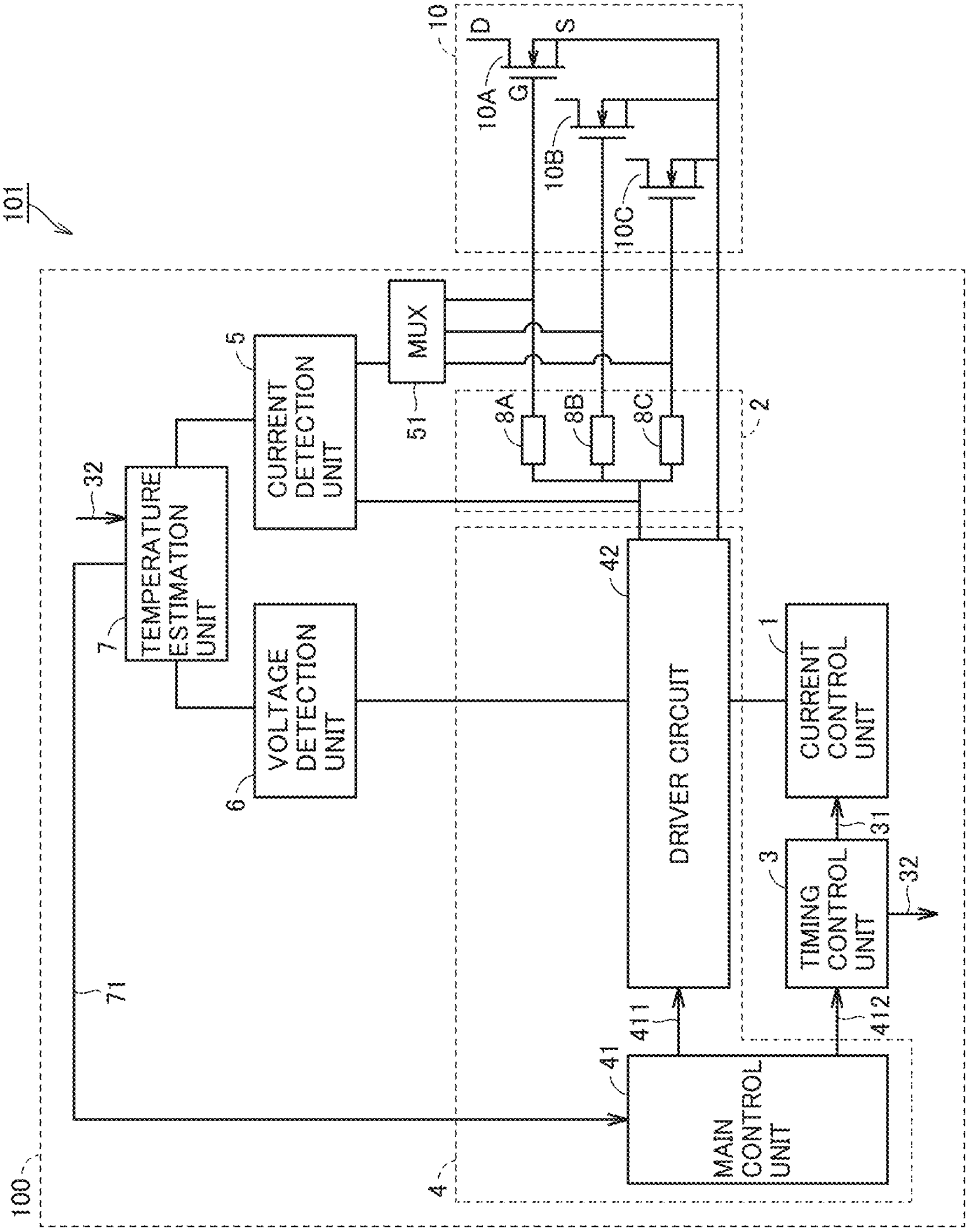
FIG. 12 is a configuration diagram illustrating a power module according to a fourth embodiment.

FIG. 12 is a configuration diagram illustrating a power module according to the fourth embodiment. Semiconductor device 100 in FIG. 12 is different from semiconductor device 100 in FIG. 1A in further including a switching circuit (MUX) 51 and resistance elements 8A, 8B, and 8C respectively connected to control terminals G of power semiconductor elements 10A, 10B, and 10C. The other configurations in FIG. 12 are the same as those in FIG. 1A, and thus, the same or corresponding parts in the drawings are denoted by the same reference signs, and the description thereof will not be repeated.

Switching circuit 51 is connected between current detection unit 5 and control terminal G of each of power semiconductor elements 10A, 10B, and 10C. In this case, current detection unit 5 detects a current flowing through gate wires including resistance elements 8A, 8B, and 8C. Specifically, gate current $I_g$ of each power semiconductor element 10 is detected from the voltage across each of resistance elements 8A, 8B, and 8C. A signal for controlling switching by switching circuit 51 may be supplied via temperature estimation unit 7 or may be directly supplied from main control unit 41. The current detection unit is provided to detect a current flowing through, for example, the gate wiring unit including resistance elements 8A, 8B, and 8C.

As in the first embodiment, a gate resistance may not be provided outside power semiconductor element 10, or the resistance element may be provided on the source side, depending on applications. Examples of other configurations of current detection unit 5 include a current transformer, a Hall element, and a Rogowski coil.

Figure 13:
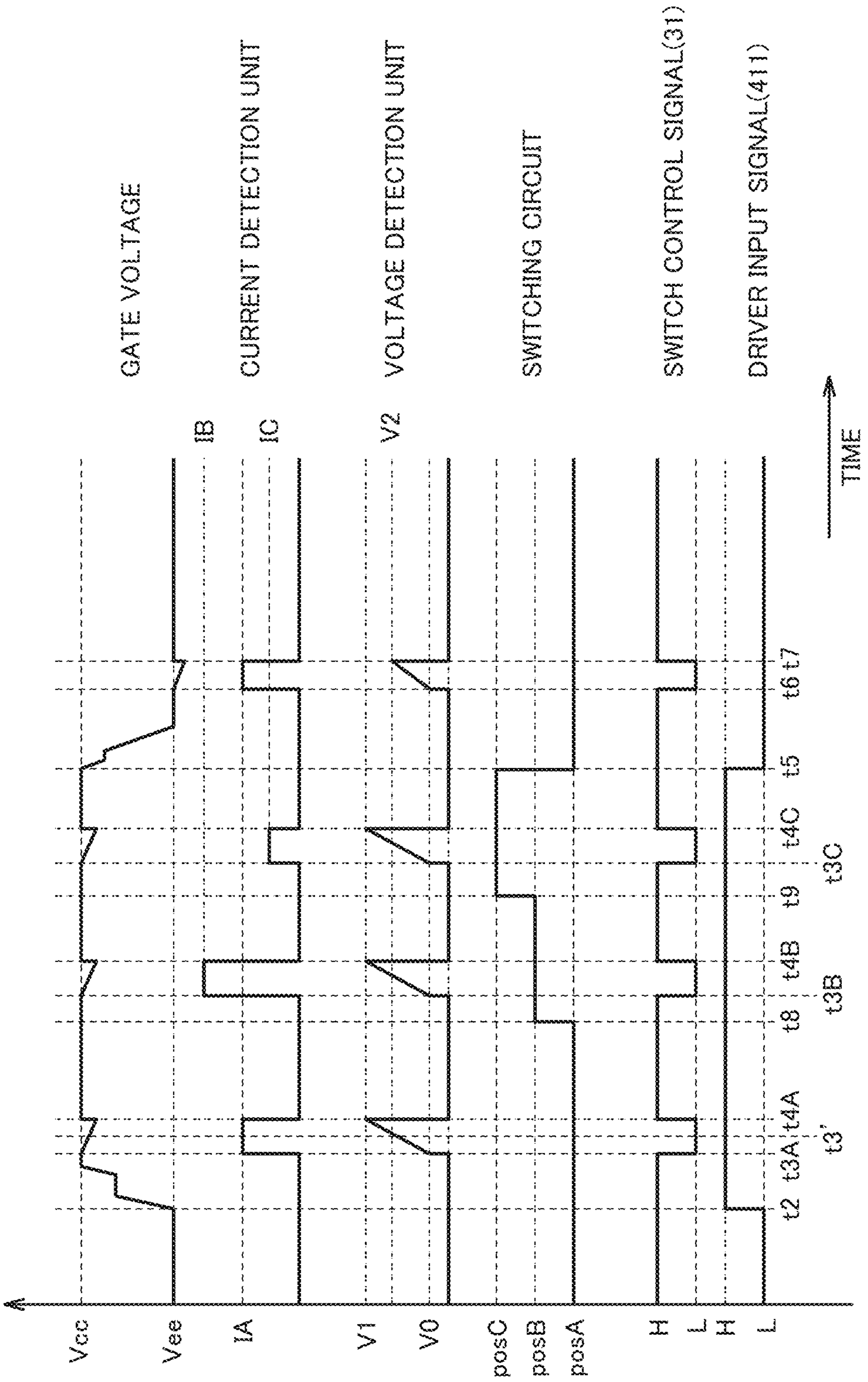
FIG. 13 is a timing chart for describing a method for measuring temperatures of power semiconductor elements 10A, 10B, and 10C by semiconductor device 100 illustrated in FIG. 12 (first method).
Figure 14:
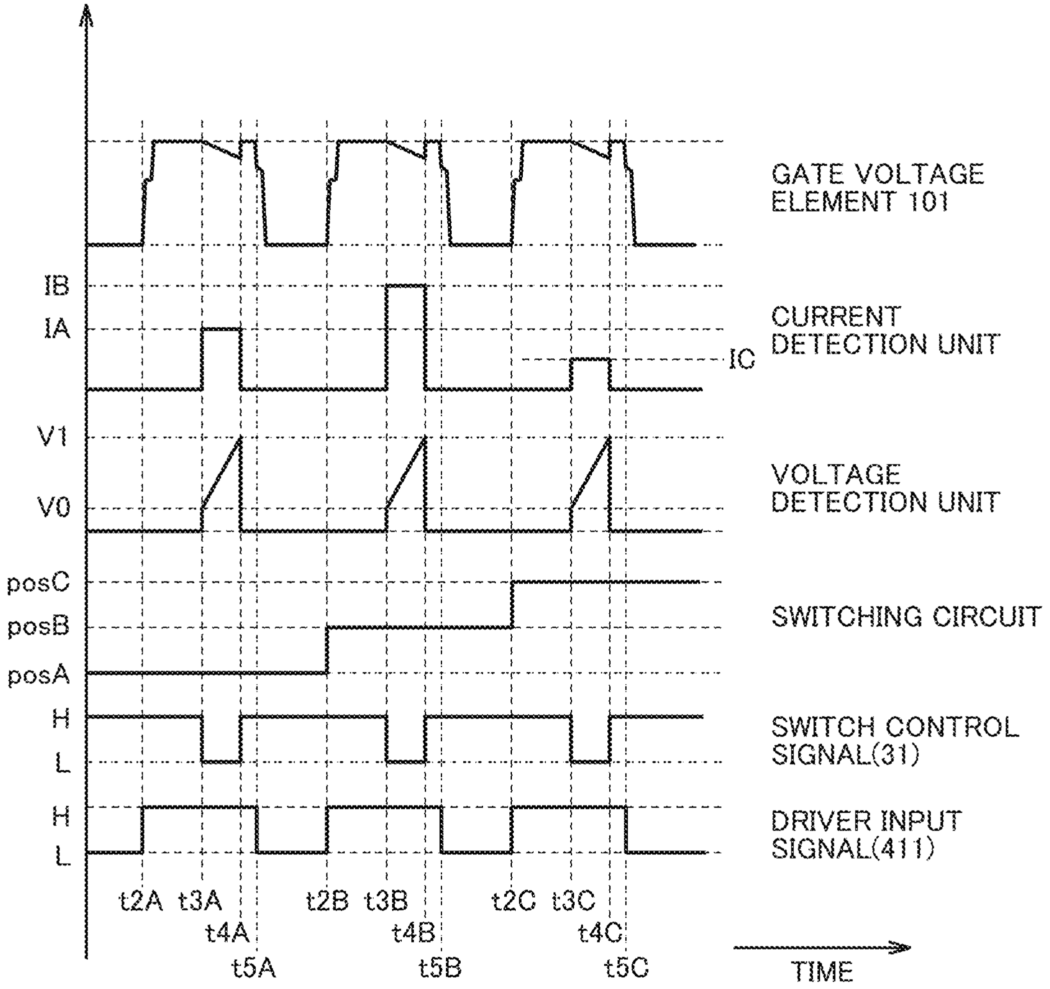
FIG. 14 is a timing chart for describing a method for measuring temperatures of power semiconductor elements 10A, 10B, and 10C by semiconductor device 100 illustrated in FIG. 12 (second method).

FIGS. 13 and 14 are timing charts for describing a method for measuring temperatures of power semiconductor elements 10A, 10B, and 10C by semiconductor device 100 illustrated in FIG. 12. The following two methods are conceivable as the switching timing of switching circuit 51 in FIG. 12.

[First Method]

As illustrated in FIG. 13, the first method is for switching gate wiring unit 2 to be measured in one switching cycle. Although FIG. 13 illustrates the measurement method during the on-period, the temperature of each power semiconductor element 10 can be measured similarly during the off-period.

Specifically, during the on-period or the off-period of power semiconductor elements 10A, 10B, and 10C, a changeover switch of switching circuit 51 is switched to terminals posA, posB, and posC in this order. Here, terminal posA is connected to resistance element 8A, terminal posB is connected to resistance element 8B, and terminal posC is connected to resistance element 8C. That is, the terminals are connected to power semiconductor elements 10A, 10B, and 10C, respectively.

For example, in the example of FIG. 13, main control unit 41 connects the changeover switch of the switching circuit to terminal posA at the start of the sequence. Therefore, first, the temperature of power semiconductor element 10A is measured.

Timing control unit 3 switches switch control signal 31 to the L level at time t3A after a lapse of a certain delay time from time t2 at which the driver input signal has been turned to the H level. As a result, current detection unit 5 measures a current IA of a path passing through power semiconductor element 10A. Voltage detection unit 6 measures the voltage of the parallel connection circuit of power semiconductor elements 10A, 10B, and 10C. That is, according to Expression (1), the voltage detected by voltage detection unit 6 rises to voltage V0 corresponding to the resistance component of the power semiconductor element, and then rises to voltage V1 according to element capacitance $C_{die}$, gate current value $I_g$, and an energization period from t4A to t3A. Temperature estimation unit 7 calculates an equivalent resistance value of power semiconductor element 10A from the voltage value and the current value in this period, and estimates the temperature of power semiconductor element 10A from comparison with calibration data acquired in advance.

Timing control unit 3 sets switch control signal 31 to the H level at time t4A after a lapse of a certain period from time t3A. As a result, when the current injection into power semiconductor element 10A is stopped, the gate voltage of power semiconductor element 10A returns to power supply voltage Vcc of driver circuit 42. The above certain period is selected so that an increase amount of voltage determined to reduce the variation in capacitance $C_{die}$ of the power semiconductor element is obtained as described in, for example, the second embodiment.

Next, at time t8 after a certain delay time has elapsed from time t4A, switching circuit 51 switches the changeover switch to terminal posB. This delay time is, for example, longer than a time constant that can be calculated from the values of a change (V1) in the gate voltage, capacitance $C_{die}$ of the power semiconductor element, gate resistance $R_g$, and internal gate resistance $R_{gint}$.

Thereafter, at time t3B, timing control unit 3 sets switch control signal 31 to the L level again, thereby supplying a current from current supply 11 of current control unit 1 to each power semiconductor element 10. Since the changeover switch of switching circuit 51 is connected to terminal posB, current detection unit 5 detects a current IB of a path passing through power semiconductor element 10B. Voltage detection unit 6 detects the voltage of the parallel connection circuit of power semiconductor elements 10A, 10B, and 10C. That is, according to Expression (1), the voltage detected by voltage detection unit 6 rises to voltage V0 corresponding to the resistance component of the power semiconductor element, and then rises to voltage V1 according to element capacitance $C_{die}$, gate current value $I_g$, and an energization period from t4B to t3B. In FIG. 13, the time from time t3B to time t4B is the same as the time from time t3A to time t4A, and thus, the voltage detected by voltage detection unit 6 similarly rises to V1. Temperature estimation unit 7 calculates an equivalent resistance value of power semiconductor element 10B from the voltage value and the current value in this period, and estimates the temperature of power semiconductor element 10B from comparison with calibration data acquired in advance.

Timing control unit 3 sets switch control signal 31 to the H level at time t4B after a lapse of a certain period from time t3B. As a result, when the current injection into power semiconductor element 10B is stopped, the gate voltage of power semiconductor element 10B returns to power supply voltage Vcc of driver circuit 42.

Next, at time 19 after a certain delay time has elapsed from time t4B, switching circuit 51 switches the changeover switch to terminal posC. This delay time is, for example, longer than a time constant that can be calculated from the values of a change (V1) in the gate voltage, capacitance $C_{die}$ of the power semiconductor element, gate resistance $R_g$, and internal gate resistance $R_{gint}$.

Thereafter, at time t3C, timing control unit 3 sets switch control signal 31 to the L level again, thereby supplying a current from current supply 11 of current control unit 1 to each power semiconductor element 10. Since the changeover switch of switching circuit 51 is connected to terminal posC, current detection unit 5 detects a current IC of a path passing through power semiconductor element 10C. Voltage detection unit 6 detects the voltage of the parallel connection circuit of power semiconductor elements 10A, 10B, and 10C. That is, according to Expression (1), the voltage detected by voltage detection unit 6 rises to voltage V0 corresponding to the resistance component of the power semiconductor element, and then rises to voltage V1 according to element capacitance $C_{die}$, gate current value $I_g$, and an energization period from t4C to t3C. In FIG. 13, the time from time t3C to time t4C is the same as the time from time t3A to time t4A, and thus, the voltage detected by voltage detection unit 6 similarly rises to V1. Temperature estimation unit 7 calculates equivalent resistance of power semiconductor element 10C from the voltage value and the current value in this period, and estimates the temperature of power semiconductor element 10C from comparison with calibration data acquired in advance.

In the above description, the internal gate resistances, external resistance elements 8A, 8B, and 8C, element capacitances $C_{die}$, and the element temperatures of power semiconductor elements 10A, 10B, and 10C are different, and thus, currents IA, IB, and IC detected by current detection unit 5 are also different.

As described above, by switching the connection destination of current detection unit 5 by switching circuit 51, the element temperatures of power semiconductor elements 10 connected in parallel can be individually measured without increasing driver circuit 42 and current detection unit 5.

[Second Method]

In the first method, the temperature is measured a plurality of times in a single switching cycle, so that the gate voltage may greatly vary, by which the loss of power semiconductor element 10 may increase. The second method is provided to improve this point.

As illustrated in FIG. 14, the second method is for switching gate wiring unit 2 to be measured for each switching cycle. Although FIG. 14 illustrates the measurement method during the on-period, the temperature of each power semiconductor element 10 can be measured similarly during the off-period, except that the gate voltage and driver input signal 411 are different. Although terminal posA is selected as a default connection destination of the changeover switch of switching circuit 51 in the following description, terminals posB and posC may be determined as the default connection destination.

When driver input signal 411 is turned to H at time t2A, the gate voltages of power semiconductor elements 10A, 10B, and 10C start to rise.

Thereafter, when timing control unit 3 sets switch control signal 31 to the L level at time t3A after a lapse of a certain period, a current starts to flow from the current control unit to power semiconductor elements 10A, 10B, and 10C. At this time, the changeover switch of switching circuit 51 is connected to terminal posA, and thus, current detection unit 5 detects current IA flowing through power semiconductor element 10A. Simultaneously, voltage detection unit 6 detects the voltage of the parallel connection circuit of power semiconductor elements 10A, 10B, and 10C. That is, according to Expression (1), the voltage detected by voltage detection unit 6 rises to voltage V0 corresponding to the resistance component of the power semiconductor element, and then rises to voltage V1 according to element capacitance $C_{die}$, gate current value $I_g$, and an energization period from t4A to t3A. Temperature estimation unit 7 calculates an equivalent resistance value of power semiconductor element 10A from the voltage value and the current value in this period, and estimates the temperature of power semiconductor element 10A from comparison with calibration data acquired in advance.

Then, when timing control unit 3 sets switch control signal 31 to the H level, the current injection into power semiconductor element 10A is stopped, and the gate voltage of power semiconductor element 10A returns to power supply voltage Vcc of driver circuit 42.

Next, main control unit 41 connects the changeover switch of switching circuit 51 to terminal posB. In FIG. 14, the switching timing of switching circuit 51 is the same as the timing at which driver input signal 411 is changed to the H level, but it is not necessarily the same timing. It is only sufficient that switching of switching circuit 51 may be performed before the timing at which switch control signal 31 is set to the L level again.

At time t3B, timing control unit 3 sets switch control signal 31 to the L level again in a state where the changeover switch of switching circuit 51 is connected to terminal posB. As a result, the current from current control unit 1 flows through power semiconductor elements 10A, 10B, and 10C. At this time, current detection unit 5 detects current IB of a path passing through power semiconductor element 10B. Voltage detection unit 6 detects the voltage of the parallel connection circuit of power semiconductor elements 10A, 10B, and 10C. That is, according to Expression (1), the voltage detected by voltage detection unit 6 rises to voltage V0 corresponding to the resistance component of the power semiconductor element, and then rises to voltage V1 according to element capacitance $C_{die}$, gate current value $I_g$, and an energization period from t4B to t3B. Temperature estimation unit 7 calculates an equivalent resistance value of power semiconductor element 10B from the voltage value and the current value in this period, and estimates the temperature of power semiconductor element 10B from comparison with calibration data acquired in advance.

Then, when timing control unit 3 sets switch control signal 31 to the H level at time t4B, the current is not output from current control unit 1, so that the gate voltage of the power semiconductor element returns to power supply voltage Vcc of driver circuit 42. Thereafter, at time t5B, main control unit 41 sets driver input signal 411 to the L level to turn off each power semiconductor element 10.

Next, main control unit 41 connects the changeover switch of switching circuit 51 to terminal posC. In FIG. 14, the switching timing of switching circuit 51 is the same as the timing at which driver input signal 411 is changed to the H level, but it is not necessarily the same timing. It is only sufficient that switching of switching circuit 51 may be performed before the timing at which switch control signal 31 is set to the L level again.

At time t3C, timing control unit 3 sets switch control signal 31 to the L level again in a state where the changeover switch of switching circuit 51 is connected to terminal posC. As a result, the current from current control unit 1 flows through power semiconductor elements 10A, 10B, and 10C. At this time, current detection unit 5 detects current 1C of a path passing through power semiconductor element 10C. Voltage detection unit 6 detects the voltage of the parallel connection circuit of power semiconductor elements 10A, 10B, and 10C. That is, according to Expression (1), the voltage detected by voltage detection unit 6 rises to voltage V0 corresponding to the resistance component of the power semiconductor element, and then rises to voltage V1 according to element capacitance $C_{die}$, gate current value $I_g$, and an energization period from t4C to t3C. Temperature estimation unit 7 calculates an equivalent resistance value of power semiconductor element 10C from the voltage value and the current value in this period, and estimates the temperature of power semiconductor element 10C from comparison with calibration data acquired in advance.

Then, when timing control unit 3 sets switch control signal 31 to the H level at time t4C, the current is not output from current control unit 1, so that the gate voltage of the power semiconductor element returns to power supply voltage Vcc of driver circuit 42. Thereafter, at time t5C, main control unit 41 sets driver input signal 411 to the L level to turn off each power semiconductor element 10.

As described above, in power module 101 according to the fourth embodiment, the temperature of the plurality of power semiconductor elements 10 connected in parallel can be individually detected by connecting current detection unit 5 to each of the plurality of power semiconductor elements 10 via switching circuit 51.

Fifth Embodiment

The fifth embodiment will describe the method for estimating temperature by temperature estimation unit 7 in detail. The configurations other than temperature estimation unit 7 are similar to those described in the first to fourth embodiments, and thus the description thereof will not be repeated. Although the temperature measurement during the on-period of power semiconductor element 10 will be described below, the same applies to the temperature measurement during the off-period.

Figure 15:
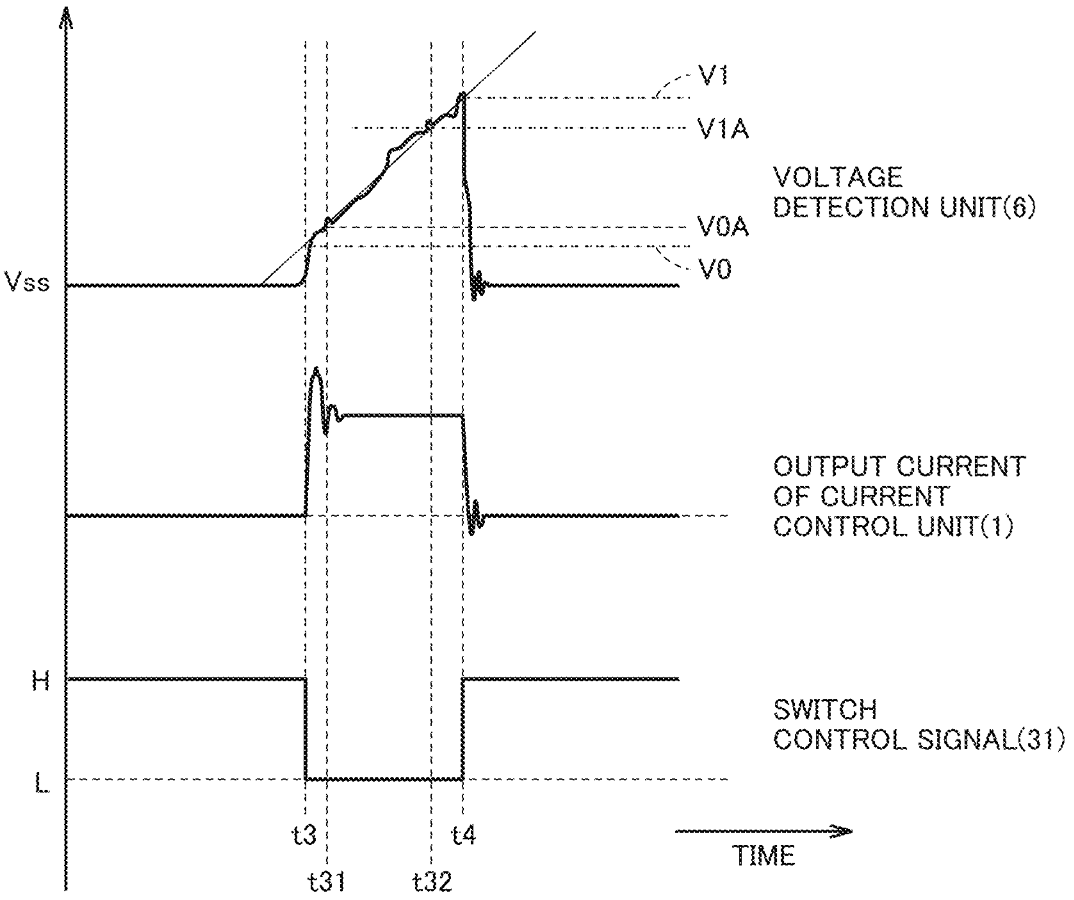
FIG. 15 is a diagram illustrating, in a more substantive manner, the waveform of an output current of current control unit 1 and the waveform of a detection voltage detected by a voltage detection unit 6 when a switch control signal 31 is at an L level.

FIG. 15 is a diagram illustrating, in a more substantive manner, the waveform of the current output from current control unit 1 and the waveform of the detection voltage detected by voltage detection unit 6 when switch control signal 31 is at the L level.

Referring to FIG. 15, when switch control signal 31 is at the L level at time t3, the current flowing from current supply 11 to current control switch 12 in current control unit 1 flows to power semiconductor element 10. At this time, a surge current and a surge voltage are generated due to the wiring inductance and a change in current from current supply 11. As a result, vibration occurs in the waveform of the output current of current control unit 1 and the waveform of the detection voltage of voltage detection unit 6. Furthermore, the waveform of the detection voltage of voltage detection unit 6 does not necessarily rise linearly due to the influence of external noise and noise generated from current supply 11 other than the above factors.

In the above case, voltage detection unit 6 measures the voltage at time t31 at which the surge current and the surge voltage are lower than those at time t3. When a time difference Δt from time t3 to time t31 is measured, the equivalent resistance value of power semiconductor element 10 can be calculated from the values of the voltage and the current detected at time t31. If time difference Δt between time t31 and time t3 is within a certain allowable range, it is considered that the above resistance value represents the resistance of power semiconductor element 10. The allowable amount of deviation between time t3 and time t31 can be selected so that $I_g \cdot (t31-t3)/C_{die}$, which is a voltage value calculated from the output current from current control unit 1 and capacitance $C_{die}$ of power semiconductor element 10, is less than or equal to the detection sensitivity of voltage detection unit 6. As described above, the temperature of power semiconductor element 10 can be estimated from detection data at one time point t31.

When the accuracy of the temperature measurement is further required, voltage detection unit 6 also detects the voltage at time t32 immediately before switch control signal 31 is returned to the H level. As a result, the slope of the voltage rise detected by voltage detection unit 6 can be calculated from the potential difference ΔV=V1A−V0A of the voltages detected at two time points, which are time t31 and time t32, and time difference Δt'=t32−t31. By measuring time t3 at which current control switch 12 is changed to the L level, voltage value V0 at time t3 can be calculated together with the information regarding the slope of the voltage rise. Furthermore, the resistance value can be calculated from the current value at this time.

Although the example in which the temperature is measured at two or less time points has been described above, the calculation accuracy of the slope can be improved by further increasing the number of data points. In general, the slope is calculated from a plurality of data points using a least squares method or the like. Thus, noise from current control unit 1 and measurement errors of voltage detection unit 6 are averaged. As described above, temperature measurement accuracy can be improved by using time information for calculation.

Sixth Embodiment

The sixth embodiment will describe a temperature estimation operation by temperature estimation unit 7 using a method different from that of the fifth embodiment. The configurations other than temperature estimation unit 7 are similar to those described in the first to fourth embodiments, and thus the description thereof will not be repeated. Although the temperature measurement during the on-period of power semiconductor element 10 will be described below, the same applies to the temperature measurement during the off-period.

Figure 16:
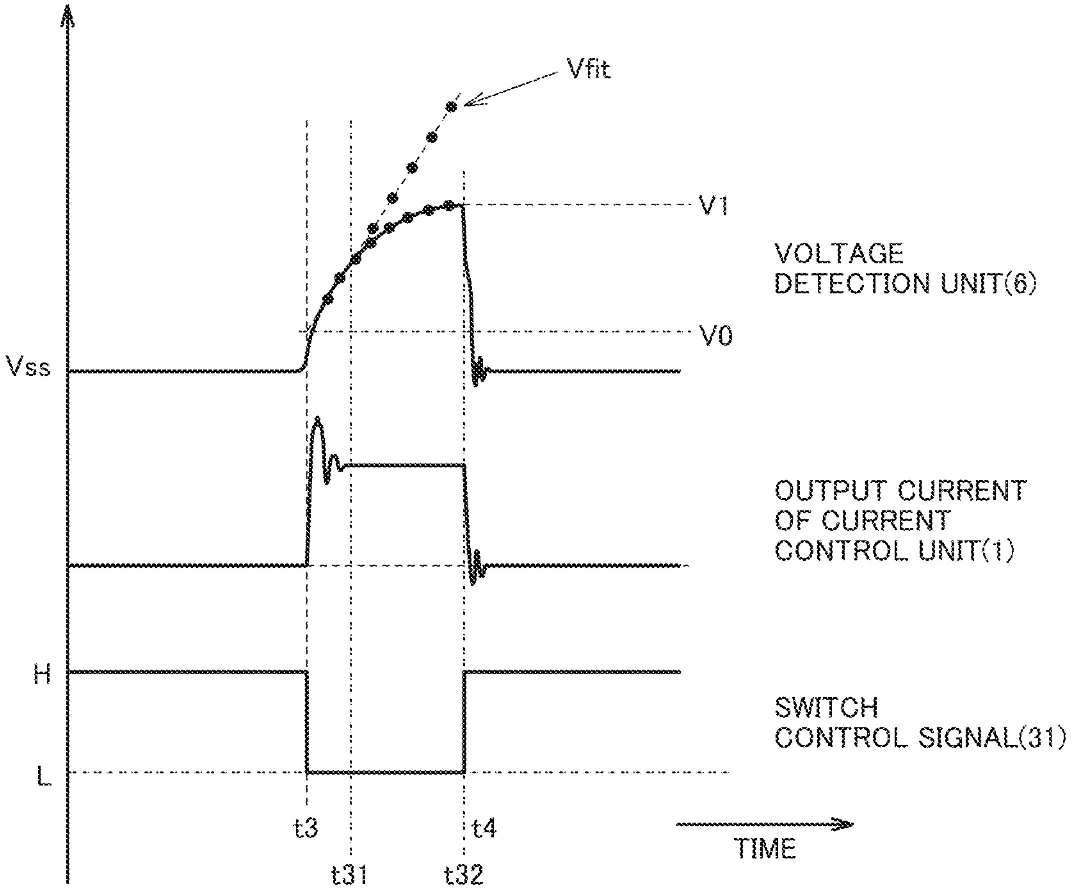
FIG. 16 is a timing chart for describing the operation of a temperature estimation unit in a power module according to a sixth embodiment.
Figure 17:
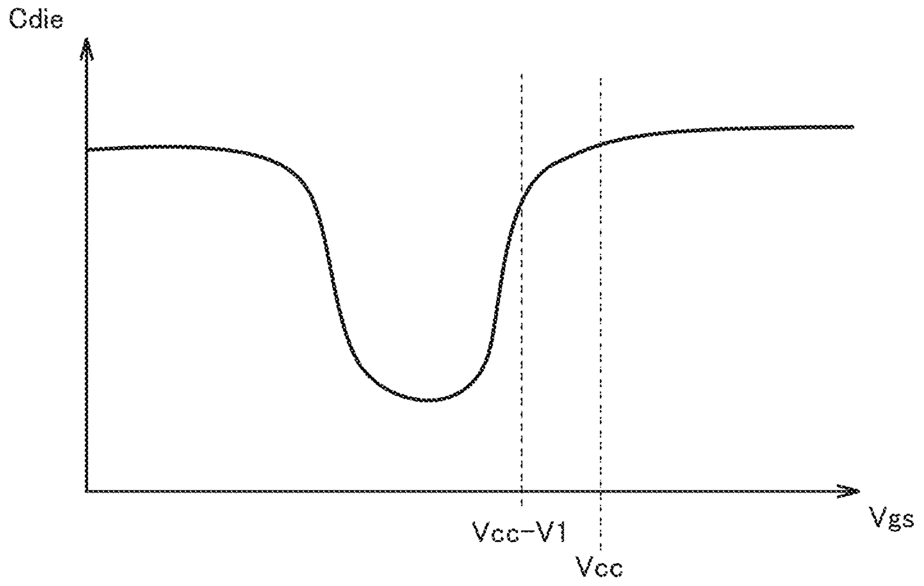
FIG. 17 is a diagram illustrating an example of capacitance characteristics of the power semiconductor element.

FIG. 16 is a timing chart for describing the operation of the temperature estimation unit in a power module according to the sixth embodiment. FIG. 17 is a diagram illustrating an example of capacitance characteristics of a power semiconductor element.

As illustrated in FIG. 17, capacitance $C_{die}$ of the power semiconductor element changes according to gate-source voltage Vgs and drain-source voltage $V_{ds}$ of the power semiconductor element. FIG. 16 illustrates an example in which the capacitance characteristic greatly varies depending on gate-source voltage Vgs within a range of the maximum voltage variation V1 at the time of temperature measurement due to power supply voltage Vcc of driver circuit 42 being low.

When the dependency of element capacitance $C_{die}$ of power semiconductor element 10 on gate-source voltage Vgs is taken into consideration, above Expression (1) is represented as following Expression (2). In following Expression (2), $C_{die}$(Vgs) represents a function of gate-source voltage Vgs of element capacitance $C_{die}$.
[Expression 2]

[Expression 2]

$$V_{Ig}(t-t3) = (R_g + R_{gint}) \cdot I_g + \frac{t-t3}{C_{die}(V_{gs})} \cdot I_g \,\Big|_{t \geq t3} \tag{2}$$

In order to obtain voltage $V_{Ig}$ at time t according to above Expression (2), it is necessary to correct element capacitance $C_{die}$ according to gate-source voltage Vgs. In view of this, in the sixth embodiment, the capacitance characteristic indicating the relationship between element capacitance $C_{die}$ of power semiconductor element 10 and gate-source voltage Vgs is acquired in advance, and the data thereof is stored in a memory of main control unit 41.

Further, voltage detection unit 6 continuously acquires voltage data from time t31 to time t32 as illustrated in FIG. 16. The gate-source voltage of power semiconductor element 10 can be calculated by using the detection data of voltage detection unit 6 and the value of power supply voltage Vcc or ground voltage Vee. An approximate straight line Vfit of the detection voltage of voltage detection unit 6 when element capacitance $C_{die}$ is constant can be calculated from the capacitance characteristic data acquired in advance, the gate-source voltage data, and the measurement time information. Approximate straight line Vfit of the detection voltage is linear because element capacitance $C_{die}$ is constant. Therefore, voltage V0 at time t3 can be calculated from the time information at time t31 and time t32 and the approximate voltages at times t31 and t32.

As described above, the temperature measurement accuracy can be improved by acquiring the capacitance characteristic data indicating the relationship between element capacitance $C_{die}$ of power semiconductor element 10 and gate-source voltage Vgs in advance. Although the dependency regarding gate-source voltage Vgs has been described above, correction can be also performed on drain-source voltage Vas in a similar manner.

Seventh Embodiment

Figure 18:
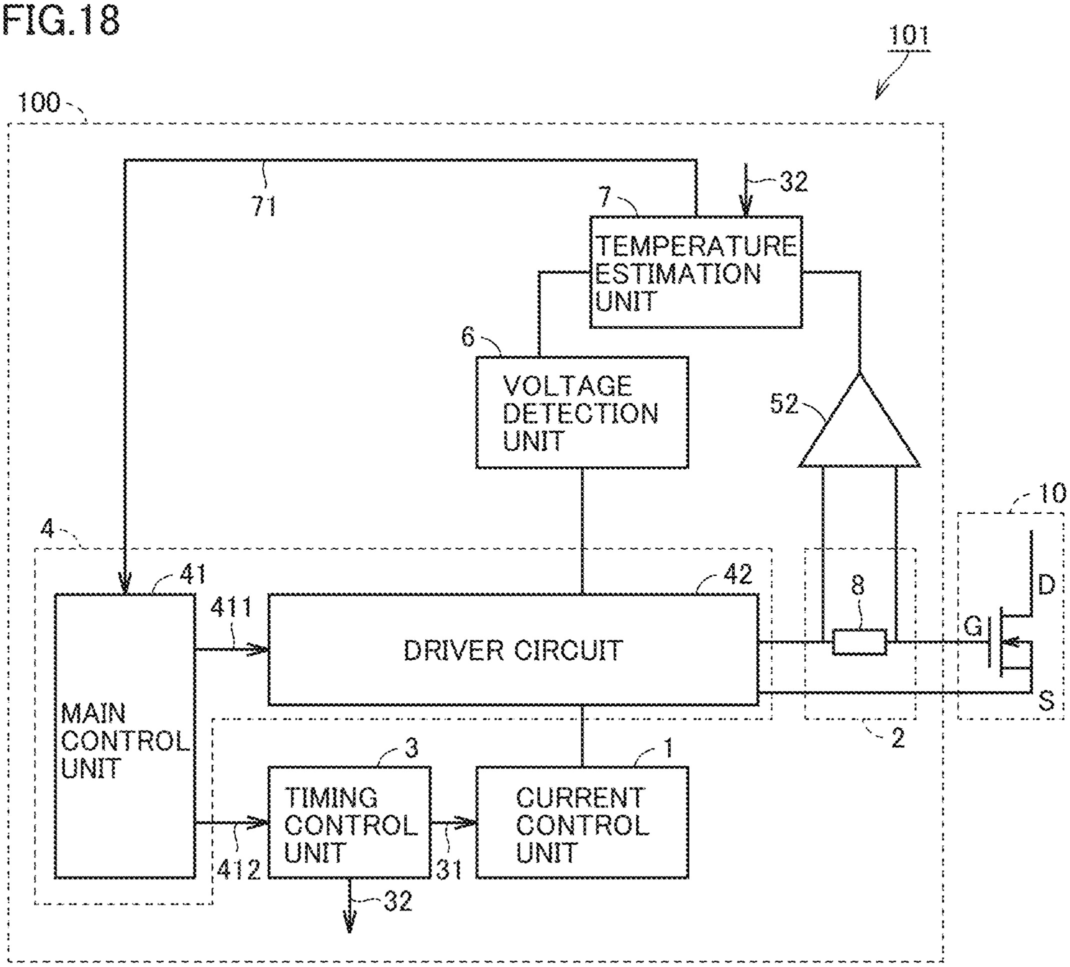
FIG. 18 is a configuration diagram illustrating a power module according to a seventh embodiment.

FIG. 18 is a configuration diagram illustrating a power module according to the seventh embodiment. Semiconductor device 100 of power module 101 in FIG. 18 is different from the semiconductor devices of the power modules according to the first to sixth embodiments in that a differential voltmeter 52 is provided instead of current detection unit 5. The other configurations in FIG. 18 are the same as those in FIG. 1A, and the like, and thus, the same or corresponding parts in the drawings are denoted by the same reference signs, and the description thereof will not be repeated.

Semiconductor device 100 of power module 101 according to the seventh embodiment detects the voltage across resistance element 8 by differential voltmeter 52 (for example, an instrumentation amplifier). Depending on the configuration of driver circuit 42, an additional gate resistance may be provided in addition to resistance element 8 in FIG. 18. This makes it possible to improve a degree of freedom of substrate wiring when a driver substrate is produced.

Temperature estimation unit 7 uses a value obtained by subtracting the detection value by differential voltmeter 52 from the detection voltage of voltage detection unit 6 as a voltage value, and calculates a resistance value using the voltage value thus obtained and a current value based on the detection value of differential voltmeter 52. In this way, the voltage drop due to resistance element 8 can be removed, so that the temperature estimation accuracy can be improved.

Eighth Embodiment

In the eighth embodiment, power modules 101 according to the first to seventh embodiments described above are applied to a power conversion device. The eighth embodiment will describe a case where the present disclosure is applied to a three-phase inverter, although the present disclosure is not limited to a specific power conversion device.

Figure 19:
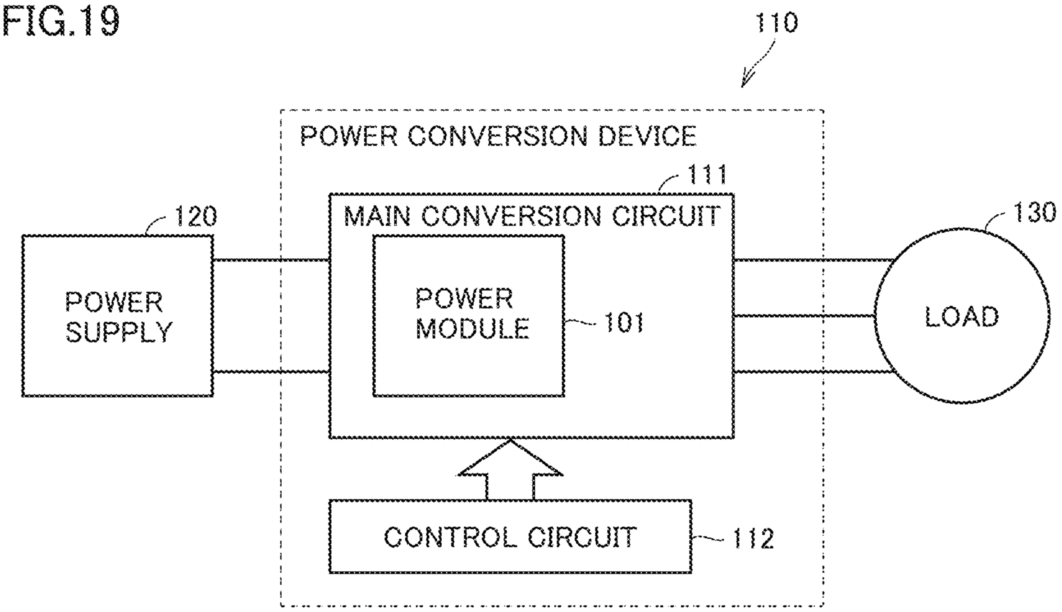
FIG. 19 is a block diagram illustrating a configuration of a power conversion system to which a power conversion device according to the present embodiment is applied.

FIG. 19 is a block diagram illustrating a configuration of a power conversion system to which the power conversion device according to the present embodiment is applied.

The power conversion system illustrated in FIG. 19 includes a power supply 120, a power conversion device 110, and a load 130. Power supply 120 is a DC power supply, and supplies DC power to power conversion device 110. Power supply 120 can be of any type. For example, power supply 120 can be a DC system, a solar cell, and a storage battery, or may be constituted by a rectifier circuit or an AC/DC converter connected to an AC system. Alternatively, power supply 120 may be constituted by a DC/DC converter that converts DC power output from the DC system into predetermined power.

Power conversion device 110 is a three-phase inverter connected between power supply 120 and load 130, converts DC power supplied from power supply 120 into AC power, and supplies the AC power to load 130. As illustrated in FIG. 19, power conversion device 110 includes a main conversion circuit 111 that converts DC power into AC power and outputs the AC power, and a control circuit 112 that outputs a control signal for controlling main conversion circuit 111 to main conversion circuit 111.

Load 130 is a three-phase electric motor driven by the AC power supplied from power conversion device 110. Load 130 is not limited to a specific application, and is an electric motor mounted on various electric devices such as an electric motor for a hybrid vehicle, an electric vehicle, a railway vehicle, an elevator, or an air conditioner.

The detail of power conversion device 110 will be described below. Main conversion circuit 111 includes a switching element and a freewheeling diode (not illustrated), converts DC power supplied from power supply 120 into AC power by switching of the switching element, and supplies the AC power to load 130. Although there are various specific circuit structures of main conversion circuit 111, main conversion circuit 111 according to the present embodiment can be a two-level three-phase full bridge circuit including six switching elements and six freewheeling diodes antiparallel to the respective switching elements. At least one of the switching elements of main conversion circuit 111 is power semiconductor element 10 included in power module 101 according to any one of the above-described first to seventh embodiments. The six switching elements are connected in series for every two switching elements to constitute upper and lower arms, and each of the upper and lower arms constitutes each phase (U-phase, V-phase, W-phase) of the full bridge circuit. The output terminals of the upper and lower arms, that is, the three output terminals of main conversion circuit 111, are connected to load 130.

In addition, since semiconductor device 100 (not illustrated) that drives each switching element is incorporated in power module 101 as described in the above first to seventh embodiments, main conversion circuit 111 includes semiconductor device 100. Semiconductor device 100 generates a drive signal for driving the switching elements of main conversion circuit 111, and supplies the drive signal to control electrodes of the switching elements of main conversion circuit 111. Specifically, the drive circuit outputs, to the control electrode of each switching element, a drive signal for turning on the switching element and a drive signal for turning off the switching element in accordance with a control signal from control circuit 112 to be described later. When the switching element is maintained in an on state, the drive signal is a voltage signal (on signal) greater than or equal to a threshold voltage of the switching element, and when the switching element is maintained in an off state, the drive signal is a voltage signal (off signal) less than or equal to or lower than the threshold voltage of the switching element.

Control circuit 112 controls the switching elements of main conversion circuit 111 so that desired power is supplied to load 130. Specifically, control circuit 112 calculates, on the basis of power to be supplied to load 130, a time (on-time) during which each switching element of main conversion circuit 111 is to be turned on. For example, control circuit 112 can control main conversion circuit 111 by PWM control that modulates the on-time of the switching element according to the voltage to be output. Then, control circuit 112 outputs a control command (control signal) to semiconductor device 100 included in main conversion circuit 111 such that, at each time point, the on signal is output to the switching element to be turned on and the off signal is output to the switching element to be turned off. Semiconductor device 100 outputs the on signal or the off signal as a drive signal to the control electrode of each switching element in accordance with the control signal.

In the power conversion device according to the present embodiment, power module 101 according to any one of the first to seventh embodiments is applied as power module 101 constituting main conversion circuit 111, whereby the reliability of the power conversion device can be improved on the basis of the temperature measurement result of the power semiconductor element.

The present embodiment has described the example in which the present disclosure is applied to a two-level three-phase inverter. However, the present disclosure is not limited thereto, and can be applied to various power conversion devices. In the present embodiment, the two-level power conversion device has been described. However, a three-level or multi-level power conversion device may be used, or the present disclosure may be applied to a single-phase inverter in a case where power is supplied to a single-phase load. In addition, in a case where power is supplied to a DC load or the like, the present disclosure can also be applied to a DC/DC converter or an AC/DC converter.

In addition, the power conversion device to which the present disclosure is applied is not limited to the one described above used for an electric motor serving as a load, and can be used as, for example, a power supply device of an electric discharge machine, a laser beam machine, an induction heating cooker, or a non-contact power feeding system, and as a power conditioner of a solar power generation system, a power storage system, or the like.

The embodiments and modifications disclosed herein are to be considered in all respects as illustrative and not restrictive. The scope of the present application is defined not by the above description but by the claims, and is intended to include meanings equivalent to the claims and all modifications within the scope.

REFERENCE SIGNS LIST

1: current control unit, 2: gate wiring unit, 3: timing control unit, 4: gate drive unit, 5: current detection unit, 6: voltage detection unit, 7: temperature estimation unit, 8, 8A to 8C: resistance element (gate resistance), 10, 10A to 10C: power semiconductor element, 11: current supply, 12: current control switch, 31: switch control signal, 32: control information, 41: main control unit, 42: driver circuit, 42H: high potential side switch, 42L: low potential side switch, 43: disconnection switch, 51: switching circuit, 52: differential voltmeter, 90: reference potential node, 100: semiconductor device, 101: power module, 110: power conversion device, 111: main conversion circuit, 112: control circuit, 120: power supply, 130: load, 411: driver input signal, 412: command

The invention claimed is:

1. A semiconductor device for driving and controlling a semiconductor element, the semiconductor element including a positive electrode terminal, a negative electrode terminal, and a control terminal for receiving supply of a drive voltage for controlling a current flowing between the positive electrode terminal and the negative electrode terminal, the semiconductor device comprising:

a pulse current supply to pass a pulsed current between the control terminal and the negative electrode terminal;

drive control circuitry to supply the drive voltage to the control terminal to shift the semiconductor element to an on state and an off state;

a current detector to detect a current being flowed through the semiconductor element by the pulse current supply;

a voltage detector to detect a voltage between the control terminal or the negative electrode terminal and a reference potential;

temperature estimation circuitry to estimate a temperature of the semiconductor element on the basis of detection values of the current detector and the voltage detector during output of the pulsed current from the pulsed current supply; and timing control circuitry to control timing to cause the pulse current supply to output the pulsed current, wherein the timing control circuitry causes the pulse current supply to output the pulsed current during an on-period after the semiconductor element shifts to the on state or during an off-period after the semiconductor element shifts to the off state.

2. The semiconductor device according to claim 1, wherein:

the timing control circuitry causes the pulse current supply to start output of the pulsed current after a certain time from when the semiconductor element shifts to the on state or after a certain time from when the semiconductor element shifts to the off state.

3. The semiconductor device according to claim 1, wherein: the timing control circuitry causes the pulse current supply to end output of the pulsed current when an amount of change of the voltage detected by the voltage detector exceeds a threshold after causing the pulse current supply to start the output of the pulsed current.

4. The semiconductor device according to claim 1, wherein:

the semiconductor element includes a resistance element for current detection by the current detector.

5. The semiconductor device according to claim 1, wherein:

the pulse current supply is connected between the negative electrode terminal and the reference potential.

6. The semiconductor device according to claim 1, wherein:

the pulse current supply is connected between the control terminal and the reference potential.

7. The semiconductor device according to claim 1, wherein:

the semiconductor element is a first semiconductor element, the semiconductor device further drives and controls a second semiconductor element connected in parallel with the first semiconductor element, and the semiconductor device further includes a switching circuit to switch connection between:

the current detector; and the first semiconductor element and the second semiconductor element.

8. The semiconductor device according to claim 1, wherein:

the current detector detects a current flowing through a wire connected to the negative electrode terminal.

9. The semiconductor device according to claim 1, wherein:

the current detector detects a current flowing through a wire connected to the control terminal.

10. The semiconductor device according to claim 1, wherein:

the temperature estimation circuitry acquires the detection values of the current detector and the voltage detector at a plurality of time points in a period in which the pulsed current is output from the pulse current supply.

11. The semiconductor device according to claim 1, wherein:

the temperature estimation circuitry corrects a resistance value calculated from the detection values of the current detector and the voltage detector, based on:

an elapsed time from a start of output of the pulsed current from the pulse current supply to a detection time of the current and the voltage detected by the current detector and the voltage detector; and a value of an input capacitance of the control terminal of the semiconductor element.

12. The semiconductor device according to claim 1, wherein:

the current detector includes:

a resistance element having one end connected to the control terminal or the negative electrode terminal; and a differential voltmeter to detect a voltage generated in the resistance element.

13. The semiconductor device according to claim 12, wherein:

the temperature estimation circuitry calculates a resistance value from:

a voltage value obtained by subtracting the detection value of the differential voltmeter from the detection value of the voltage detector; and a current value based on the detection value of the differential voltmeter.

14. A power conversion device comprising:

main conversion circuitry to convert an input electric power and to output a converted electric power, the main conversion circuitry comprising the semiconductor device according to claim 1; and control circuitry to output a control signal to the main conversion circuitry for controlling the main conversion circuitry.

* * * * *